United States Patent [19]

Brown et al.

[11] Patent Number: 4,476,524
[45] Date of Patent: Oct. 9, 1984

[54] PAGE STORAGE CONTROL METHODS AND MEANS

[75] Inventors: David T. Brown; Don W. Rain, both of Poughkeepsie; Richard J. Schmalz, Wappingers Falls, all of N.Y.

[73] Assignee: International Business Machines Corporation, Armonk, N.Y.

[21] Appl. No.: 279,907

[22] Filed: Jul. 2, 1981

[51] Int. Cl.³ .......................... G06F 9/00; G06F 13/00; G06F 13/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,158,227 | 6/1979 | Baxter et al. | 364/200 |
| 4,245,307 | 1/1981 | Kapeghian et al. | 364/200 |
| 4,271,468 | 6/1981 | Christensen et al. | 364/200 |
| 4,277,826 | 7/1981 | Collins et al. | 364/200 |
| 4,317,168 | 2/1982 | Messina et al. | 364/200 |
| 4,320,456 | 3/1982 | Heise et al. | 364/200 |
| 4,354,225 | 10/1982 | Frieder et al. | 364/200 |
| 4,399,503 | 8/1983 | Hawley | 364/200 |

*Primary Examiner*—James D. Thomas
*Assistant Examiner*—Archie E. Williams, Jr.
*Attorney, Agent, or Firm*—Bernard M. Goldman

[57] ABSTRACT

The embodiment provides an independent data bus path between a random access page storage (PS), and a main storage (MS), wherein this independent data bus does not pass through any channel processor (CH) or central processor (CP). Page data transfers on the independent data bus can be controlled either (1) asynchronously by a channel processor (independently of any central processor instruction stream), or (2) synchronously by a CP (independently of any CH operation). Novel CP instructions enable the CP to synchronously control the transfer of pages in either direction on the independent data bus.

A channel program for controlling the page transfer may be initiated by a start I/O (SIO) or start subchannel (SSCH) instruction in the CPU, and it accesses a special field in a channel address word (CAW) that designates the use of the page storage. Novel PS channel command words (CCWs) in the channel program enable CH to control page transfers on the independent data bus.

A channel program may intermix both I/O CCWs and page storage CCWs to obtain a page transfer between an I/O device and PS through MS, which obtains three-media control by a single channel program.

21 Claims, 19 Drawing Figures

(CHANNEL PROCESSOR)

FIG. 4 (CHANNEL PROCESSOR)

FIG. 7 PSC(0) CONTROLS (SYNC OR ASYNC PAGING CONTROLLED BY SCP PATH)

FIG.11 (PRIOR ART ASYNC PAGING)

(PPI) PREPARE PAGE-IN CCW (PPO) PREPARE PAGE-OUT CCW (CPG) COPY PAGE CCW

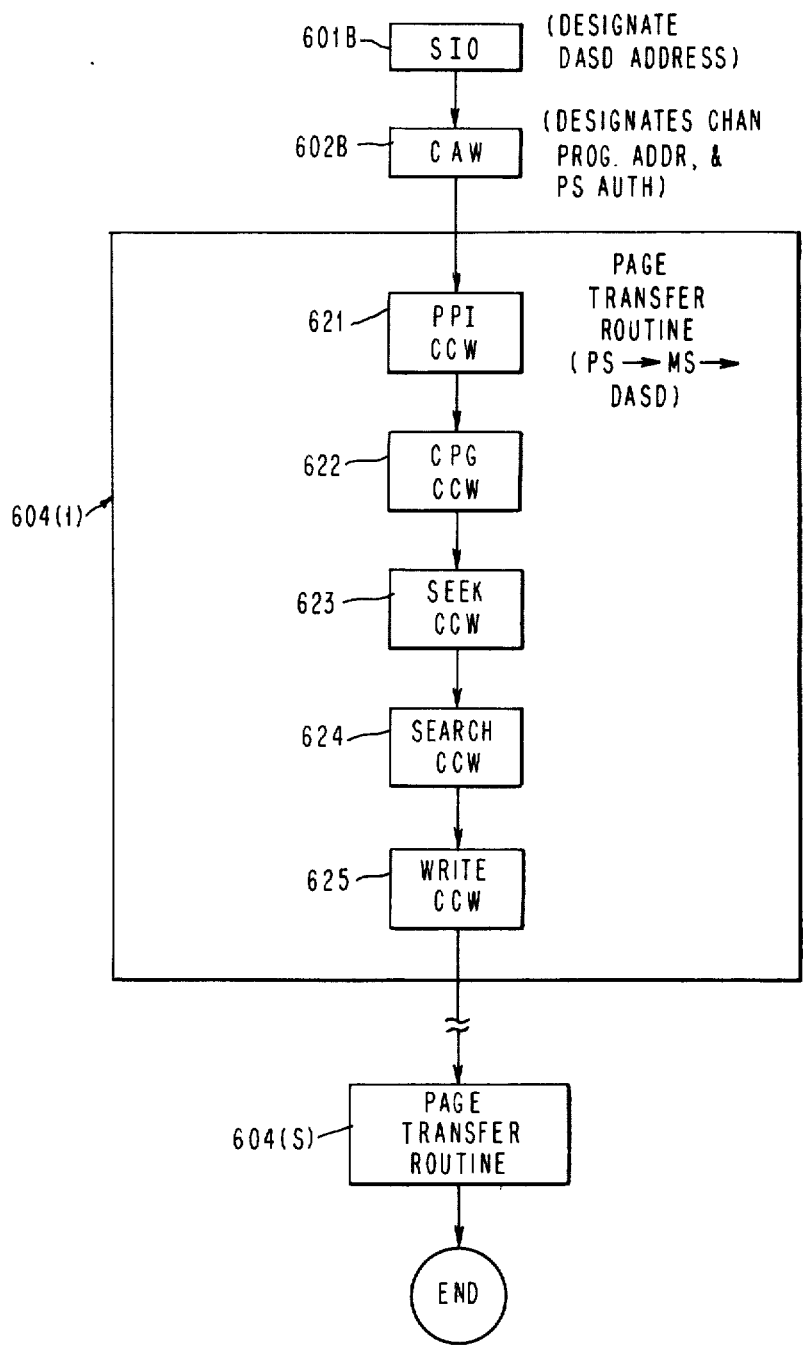

PAGE STORAGE CONTROL METHODS AND MEANS

TECHNICAL FIELD

The invention relates to the control of data transfers between a paging storage, main storage and I/O devices in a data processing system.

BACKGROUND ART

Paging storage is well known in the prior art and is provided by direct access devices (DASD) in current commercial data processing systems. Electronic storage paging devices have been suggested in the prior art, such as in an article in the IBM Technical Disclosure Bulletin Volume 23, No. 7A, December 1980, page 2908 entitled "Integrated Paging Storage" by J. T. Brady et al. Also, various means has been provided by the prior art to extend main storage by using special processor instructions to access an I/O device, such as a drum device in U.S. Pat. No. 2,796,218 (Tootill et al.) or U.S. Pat. No. 3,292,151 (Barnes et al.). Tootill used a central processor to control a block transfer between a drum and core storage. Automatic means (non-instruction) to control transfers in a hierarchical storage system is disclosed in U.S. Pat. No. 3,248,702 (Kilburn et al.) in which the program addresses the larger (and lower speed) storage in the hierarchy.

The prior art discloses the paging storage as being an I/O device which is handled on the system in the manner of any other I/O device, e.g. the IBM System/370 I/O control. In such prior system, data transfers by any I/O device (including the paging device) are between the I/O device and main storage under control of a channel program initiated by the central processor executing a start I/O (SIO) instruction. Such channel program therefore always handles the transfer between two media, i.e. the I/O device and main storage. These prior two-media channel programs are initiated by system control programs (e.g. OS/370 MVS auxiliary storage manager (ASM) and input output supervisor (IOS)) executed by the central processor (CP) to enable an application program to obtain the required paging and other I/O services, respectively.

In the prior art, DASD is used to provide both the paging storage and other I/O devices, and the same type of channel programming is used for both. They are distinguished only at the CP execution level. That is, pages in the paging storage DASD are recognized by the CP virtual addressing (i.e. segment and page tables) and are accessed implicitly by page faults caused during the normal CP execution of an application program. But, I/O DASD is not accessed by page faults in the system, and can only be accessed by an explicit I/O request in a CP program.

In the prior art, a transfer between a page storage DASD and an I/O DASD requires two separate two-media channel programs. One channel program controls the transfer between the I/O DASD and main storage, and the second channel program controls the transfer between main storage and the page storage DASD. Each channel program involves the normal large amount of preparatory system control program execution by the CP which culminates in executing a start I/O instruction that initiates the channel program which controls the transfer between the two-media. As a result, a three-media transfer is obtained between the page storage DASD medium and I/O DASD medium through the main storage medium using the two channel programs, which require the execution of two start I/O instructions, each being preceeded by the normal preparatory system control program execution.

In the prior art, all data transfers between the paging storage DASD and main storage, as well as between other I/O and main storage, pass through the channel on the channel processor data bus.

SUMMARY OF THE INVENTION

The advantages and objects of the invention are:

1. To provide an independent data bus between a page storage (PS) and main storage (MS) which does not pass through a channel processor (CH) or a CP and which can be controlled by either a CP or CH.

2. To provide special CP instructions for controlling the transfer of a page in either direction on an independent data bus between a PS and a MS that only allows priority-controlled access.

3. To support the execution of a CP page transfer instruction by causing the CP to provide a separate MS access request for each MS accessible data unit in the page, in order to maintain the MS ability to award each MS access cycle to its highest priority requestor.

4. To support the execution of a CH page transfer channel control word by causing the CH to provide a separate MS access request for each MS accessible data unit in the page, in order to maintain the MS ability to award each MS access cycle to its highest priority requestor.

5. To momentarily interrupt a transfer of a page between MS and PS for a MS access by a requestor having higher priority than the page transfer requestor.

6. To provide special channel control words for controlling the transfer of a page set in either direction on an independent data bus between a PS and a MS.

7. To provide a system efficiency choice for controlling page transfers between PS and MS either synchronously or asynchronously in relation to the operation of any CP in the system.

8. To provide a single channel program that controls a transfer between three-media, e.g. PS, MS and I/O.

9. To provide a uniprocessor or multiprocessor system which contains a PS, MS and I/O and avoids the need for any special purpose hardware to enable a single channel program to control a data transfer between the PS and I/O.

10. To provide a single channel program for a three-media transfer that will greatly reduce the system control program (SCP) overhead for a CP initiating the CH programming. (The prior two-media CH programming requires two asynchronous CH programs (each controlling the data transfer between two media, e.g. (1) PS and MS, and (2) MS and I/O). The two CH programs result in twice the SCP overhead as the single three-media CH program of this invention to accomplish the same function.)

11. To allow the SCP in a system to select whether any set of one or more pages is to be transferred between PS and MS under the control of a CP or under the control of a CH.

12. To reduce SCP overhead for page transfers between a PS and a MS by having a SCP page fault determining routine cause the transfer to be synchronously controlled by a CP and by having a SCP page set swap determining routine cause the transfer to be asynchronously controlled by a CH.

13. To allow the SCP in a data processing system to use the number of pages in a set as the efficiency criteria for determining whether a transfer of the set between MS and PS is to be controlled synchronously by a CP or asynchronously by a CH.

The invention is provided in a data processing system having an independent data bus path between a random access page storage (PS), and a main storage (MS), wherein this independent data bus does not pass through any channel (CH) or central processor (CP). Page data transfers on the independent data bus can be controlled either (1) asynchronously by a CH (independently of any CP instruction stream), or (2) synchronously by a CP (independently of any CH operation) but permitting interruptions in the page transfer on the independent bus while any higher priority requestor (e.g. another CP or CH) accesses Novel CP instructions cause the CP to synchronously control the transfer of pages in either direction on the independent data bus.

Novel page storage channel command words (CCWs) are also provided to enable channel processor control over the page transfers on the independent data bus. A special field is put into a channel address word (CAW) to designate the use of the page storage when a channel program having these special page storage CCWs is initiated by a start I/O (SIO) or start subchannel (SSCH) instruction to obtain a page transfer on the independent data bus.

By having an SIO or SSCH instruction specify an I/O device while the CAW designates the page storage, both I/O CCWs and page storage CCWs can be intermixed in the same channel program to obtain a page transfer between the I/O device and page storage through main storage. This provides the novelty of having a single channel program control a transfer involving three-media. The page storage may be used as an extension to the main storage or it may be used to provide another hierarchical level of storage in the system with system efficiencies improved in either case by the use of the three media channel programming.

These and other objects, features and advantages of the invention may be more fully understood and appreciated by considering the following detailed description in association with the accompanying drawings.

BRIEF DESCRIPTION OF THE DRAWINGS

FIG. 19 illustrates a block diagram embodiment of a single channel program for obtaining a three media transfer from page storage to main store to an I/O device.

DESCRIPTION OF AT LEAST ONE WAY OF CARRYING OUT THE INVENTION

Figure 1:
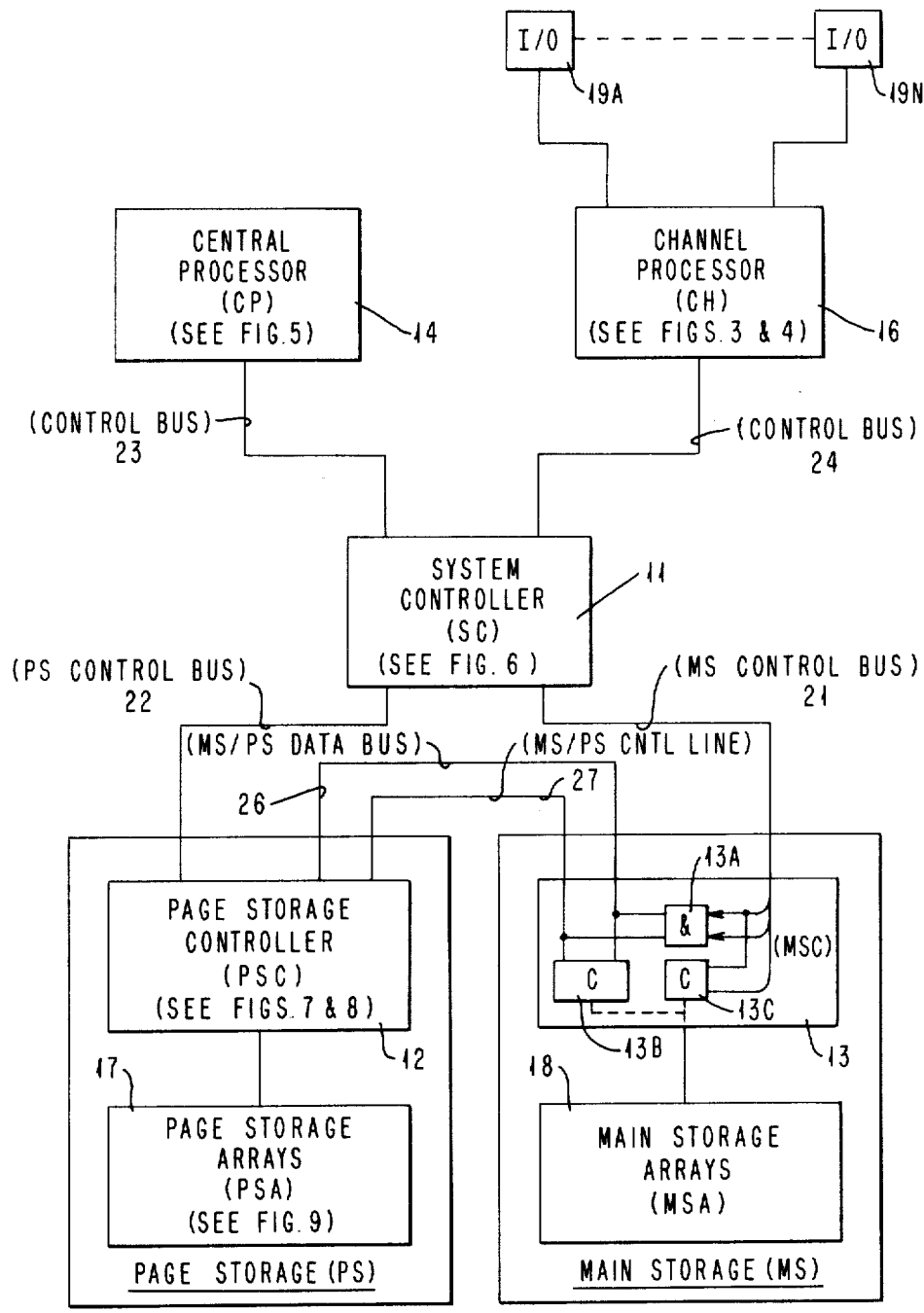
FIG. 1 is a block diagram of a uniprocessor containing the invention.

FIG. 1 illustrates a block diagram arrangement of a uniprocessor system containing the invention.

A system controller (SC) 11 is a focal point in the system receiving the busses from a page storage controller (PSC) 12, a main storage controller (MSC) 13, a central processor (CP) 14, and a channel processor (CH) 16. The PSC 12 accesses data in page storage arrays (PSA) 17, MSC 13 accesses data in main storage arrays (MSA) 18, and the channel processor 16 accesses data in any one of I/O devices 19A through 19N. The page storage (PS) is comprised of PSC 12 and PSA 17. The main storage (MS) is comprised of MSC 13 and MSA 18.

A bidirectional page data bus 26 connects between MSC 13 and PSC 12 and is an independent data bus that enables a page transfer directly between PS and MS. A page transfer on bus 26 is controlled by either CP 14 or CH 16 by means of control signals sent on either control bus 23 or control bus 24. The page address in PS is sent to PS from the SC to the MSC on the MS data bus and then from MSC to PS on the PS data bus via gates 13A which are activated by a control line signal on the MS bus to connect the page address on the MS data lines to the MS/PS data bus 26 while activating the MS/PS control line 27 to indicate the PS page address to PSC. After sending the page address to PS to initiate a page transfer, all further access addresses (e.g. line addresses) in the page are generated internally in PS, and therefore need not be communicated on any bus.

However, MS operates in the conventional manner (except for the operation of the illustrated controls 13A and 13B) and requires a command from the SC to conventional controls 13C before MS can access any unit of data, e.g. line of 128 bytes. The SC command's line address is therefore transferred to MS in the conventional manner, which permits the SC to make a separate priority decision for each line request command if plural requests are simultaneously made. Thus each line address to be accessed in MS is transferred to MS on the MS control bus 21.

Because of the necessity for an independent priority decision to be made by the SC each time an MS access is to be made so that the highest priority requestor is given access to MS at any given time, each MS/PS line transfer via gates 13B is subject to this MS priority decision by the SC. The result is that if another requestor is making a higher MS priority request than the requestor of the MS/PS transfer when any line in a page is to be transferred, the MS/PS transfer via gate 13B must pause until the MS/PS transfer requestor gets MS priority.

To permit an independent SC priority decision on each MS line access during the page transfer, the SC must be informed of each line transfer on the independent MS/PS data bus so that the SC does not try to access MS at the same time, since only one MS access can be made in the same MS array at the same time.

In the described embodiments, SC commands to MS are generated in response to a requestor command, i.e. from any CP or CH. Therefore, after each line is transferred on the MS/PS bus in either direction, a signal is sent from PS back to the page transfer requestor either to request the next line or to indicate that the page transfer is complete. In response to a PS next line request, the page transfer requestor sends a command to the SC for the next line transfer in the page, which contends with any other MS request(s) existing in the SC. When this command is given MS bus priority by the SC, the MS access is made.

This page transfer line command is also sent to PS to inform PS that MS priority has been requested and therefore PS should access the line it is currently addressing.

The MS/PS bus may be designed as a bidirectional bus that transfers a subline unit (e.g. doubleword or quadword) in either direction at a time, e.g. 16 DW or 8 QW transfers per line. Since the PS access time may be different from the MS access time, and the line access command may reach MS and PS at somewhat different times, some buffering may be needed on the MS/PS bus between PS and MS to insure all page data is transferred.

In FIG. 1, no data bus is shown between CP 14 and SC 11 or between CH 16 and SC 11, because such data bus is not used by the subject invention, even though such CP and CH data busses exist in the system for reasons not pertinent to this invention.

Figure 2:
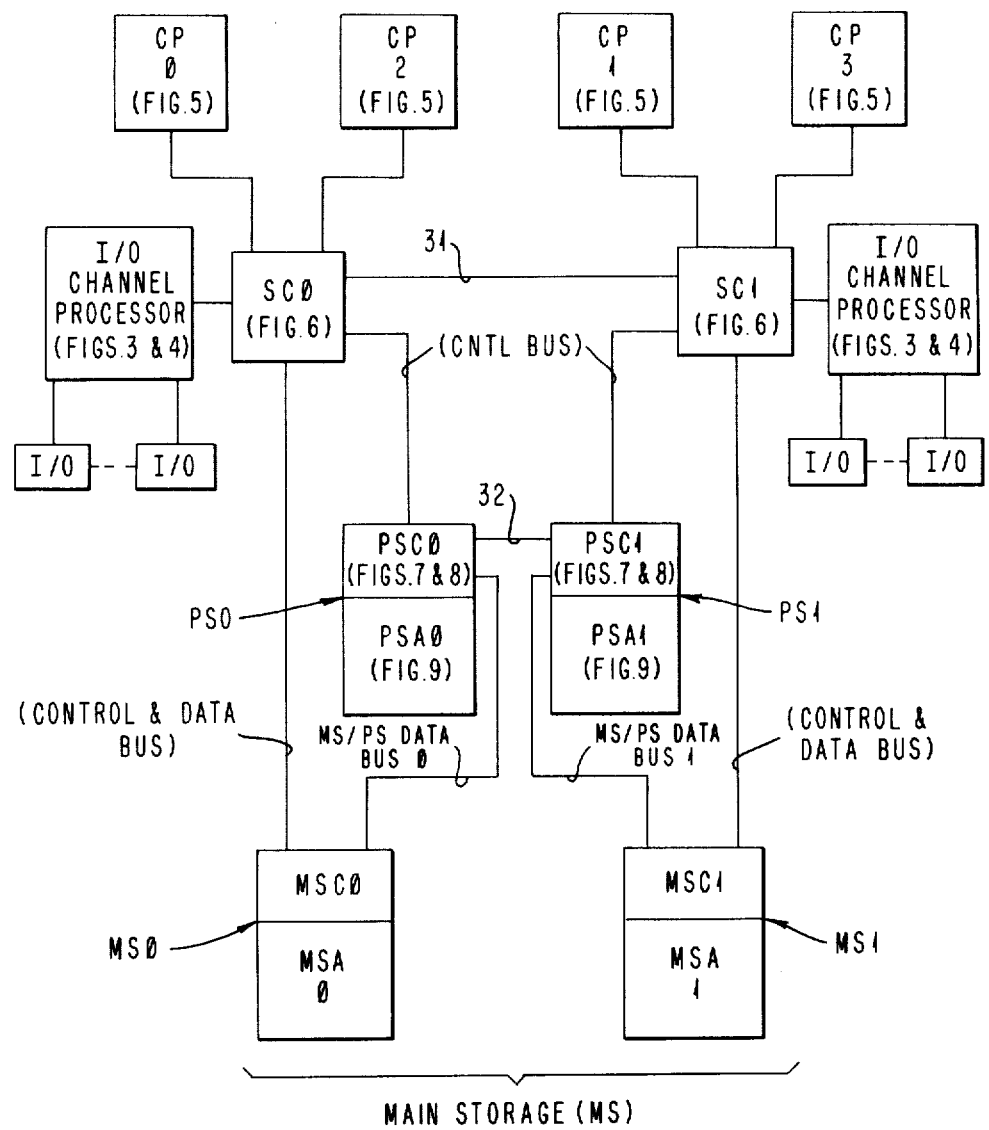
FIG. 2 is a block diagram of a multiprocessor containing the invention.

The invention can also be provided in a multiprocessor arrangement, such as is shown in FIG. 2, in which each of plural system controllers SC0 and SC1 has a page storage entity PS and a main storage entity MS connected to it in the manner shown in FIG. 1. That is, PS0 and MS0 are connected by a MS/PS data bus 0, and PS1 and MS1 are connected by MS/PS data bus 1. Each SC is also directly connected to a plurality of central processors (CPs) and an I/O channel processor (CH). Thus, SC0 is directly connected to CP0, and CP2 and CH0, while SC1 is directly connected to CP1, CP3 and CH1. SC0 and SC1 are connected by a cross-interrogation bus 31 in the same manner described and claimed in U.S. patent application Ser. No.: 205,500; Filed: Nov. 10, 1980; entitled "Improved Cache Line Shareability Control For A Multiprocessor" by F. O. Flusche et al., and assigned to the same assignee as this application.

The two PS entities PS0 and PS1 are connected together by a bus 32 to enable any page stored in either PS0 or PS1 to be transferred to or from either MS0 or MS1. Thus, either array, PSA0 or PSA1, can be accessed by the other PS controller, PSC1 or PSC0, respectively, in order to allow any CP or CH in the system to access and share any page stored in the combined PS comprised of PS0 and PS1.

PS/MS Data Busing

Figure 6:
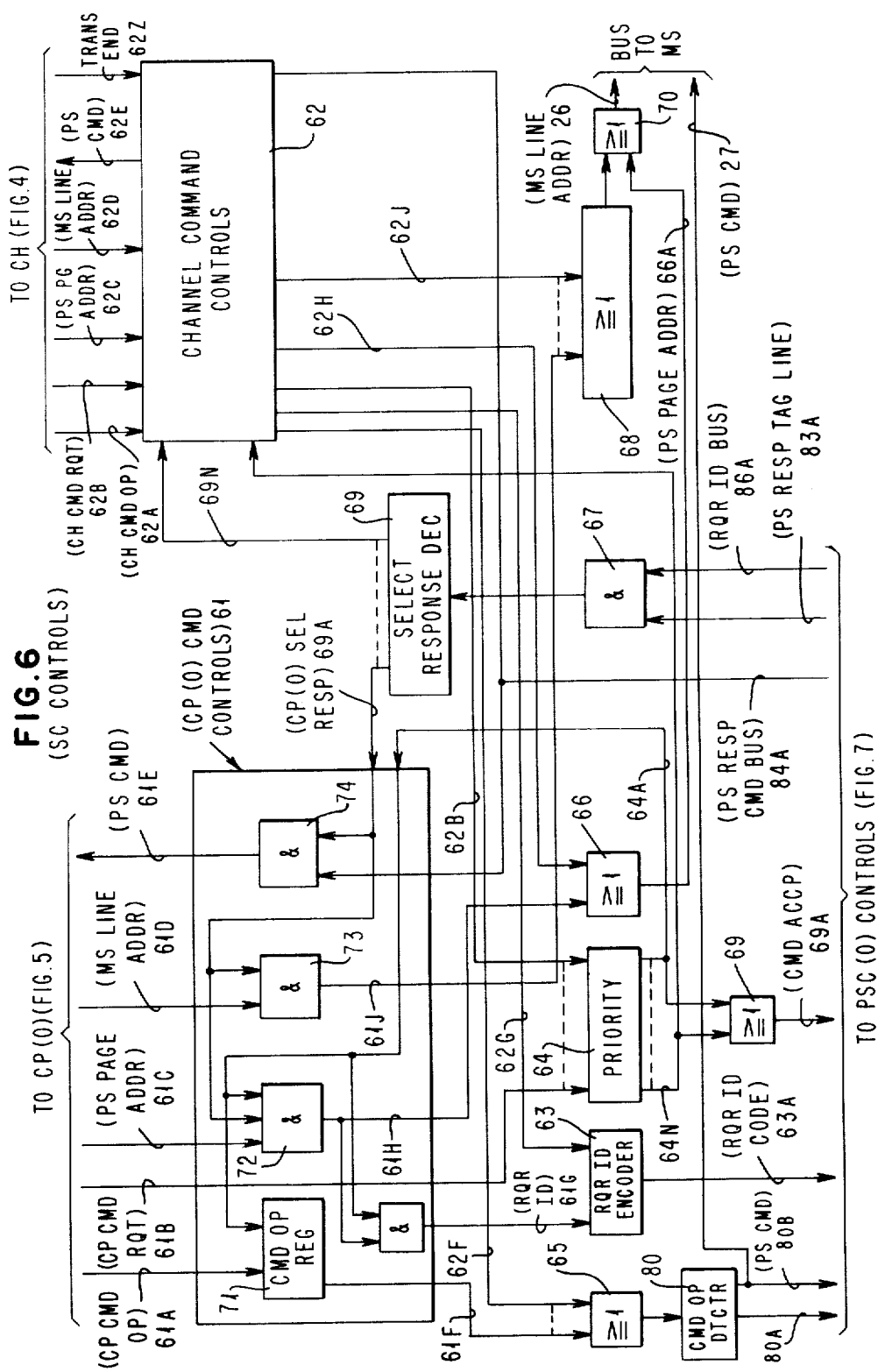
FIG. 6 represents the novel circuits within a system controller (SC) for controlling the operation of the subject invention.

FIG. 6 illustrates detailed controls found in each SC in FIGS. 1 and 2 involved in the control of a page transfer on an independent page transfer bus under control of any CP or CH connected to that SC.

FIG. 6 also illustrates SC interfaces to control buses that connect each CP and CH to the SC. Each of CP command controls 61 connects to a respective control bus that connects to a respective CP. Each CP control bus and CP command control 61 may be identical to each other. Likewise, channel command controls 62 is similar to controls 61 and similarly connects to a similar control bus that connects to a CH.

Each requestor (i.e. each CP and CH) of accesses to MS has a request signal line (i.e. 61B, 62B, etc.) provided to a MS priority circuit 64, that determines which one of simultaneous requestors shall be allowed to send its command from SC to MS at any given time. For example, when priority is granted for CP0, line 64A is activated, which conditions register 71 to receive the current command code from CP0. Likewise when priority is granted to a CH request, line 64N is activated which conditions similar circuits in channel command controls 62 to register the command operation code received from CH.

A CP command OP code in register 71 (e.g. page-in or page-out) is outputted on line 61F. In a similar manner, a CH command OP code registered in controls 62 is outputted on lines 62A when a CH command is accepted. An OR circuit 65 passes each accepted OP code to a command OP detector 80 which for a paging command generates a PS control signal on a PS command line 80B, and generates a direction signal (i.e. MS page-in or page-out) on a command direction line 80A.

Also a requestor identifier encoder 63 recognizes from which CP or CH the command was received and encodes an identifier that indicates the sending CP or CH on line 63A when a request is accepted by priority circuit 64.

Figure 7:
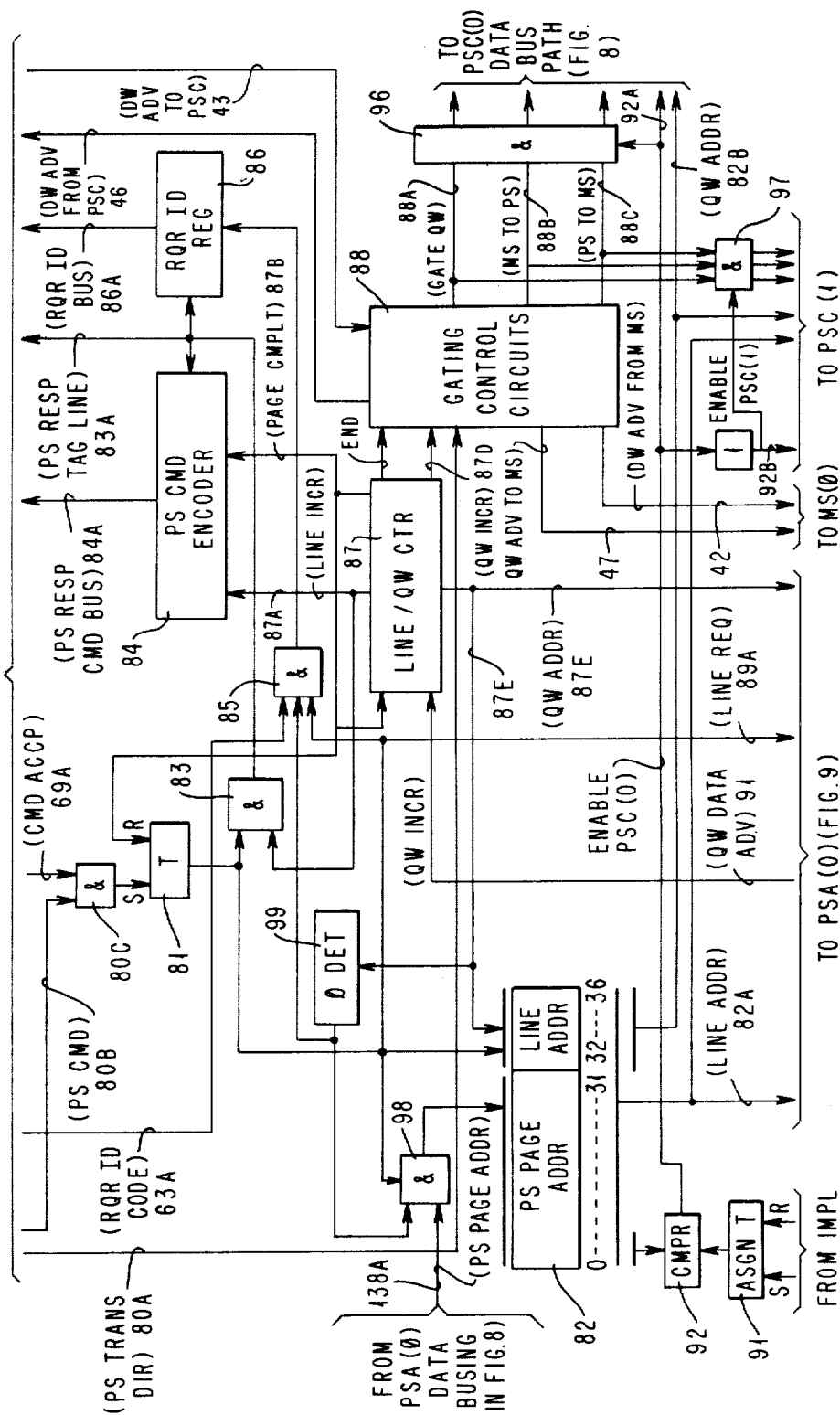
FIG. 7 illustrates the page storage controller used by the subject invention.

The PSC is signalled when a PS command is accepted by MS priority circuit 64, by means of a command accept signal provided through an OR circuit 69 on line 69A to the PSC in FIG. 7. The accept signal enables an AND gate 80C (when it also receives a PS command signal on line 80B from a command OP detector 80) to set a command accept trigger 81 in the PSC, which causes the PSC to recognize that a MS/PS transfer has been commanded.

The initial command for a page transfer accepted by the SC from any CP or CH also contains the PS page address on lines 61C, which is sent through OR circuit 66 to MS as part of an MS command. Each MS command with a PS control signal causes MS to connect its bus to the MS/PS bus 26 and its control line 27. The PS page address is provided from lines 66A through OR circuit 70 to MS data lines 70A in MS bus 26 while the MS control line 80B signals a PS command on MS bus 26. The signal on line 80B enables MS to recognize its data bus contains a PS page address, which it then gates onto the MS/PS data bus 26 while activating its control line 27 to signal the PSC that it is receiving a PS page address. This initial PS page address is also the address of the first PS line in the page being transferred, which the PS then accesses.

The initial SC command to MS for a page transfer not only contains the PS page address, but this MS command also contains the conventional signals in an MS command (i.e. the address in MS to be accessed) which is the address in the MS array of the first line in the page to be transferred. Control lines in the MS bus are activated to distinguish whether an address on the MS data bus is a PS page address or a MS line address. The second and each following MS command for a page transfer only have the MS line address. After the initial command with the PS page address, all subsequent PS line addresses are generated internal to PS and do not require any MS bus transfer.

The first acceptance by the SC of a page-in or page-out command is determined by the PSC in FIG. 7, when its AND gates 85 and 98 are activated by the acceptance trigger output and an output from an all zero detector 99 receiving a zero line address from counter 87 for the first line of the page to be transferred. Gate 98 receives the PS page address from the MS/PS data bus 26 in FIG. 8, from which it is received from MS bus 21. The PS page address is gated through an AND gate 138 in FIG. 8 by a signal on a control line 27 provided from the SC via MS to indicate a PS address exists on bus 26.

Gate 98 passes the PS address on lines 138A into bit positions 0–31 of register 82 which thereby receives the PS page address currently being provided by the SC OR circuit 66 to MS bus 70A in FIG. 6.

The initial zero state of counter 87 at the beginning of a page transfer is gated into bit positions 32–36 of the page address register 82.

Also upon the initial command acceptance by the PSC in FIG. 7, AND gate 85 is enabled to pass the requestor identifier code from lines 63A into a requestor identifier register 86.

Figure 9:
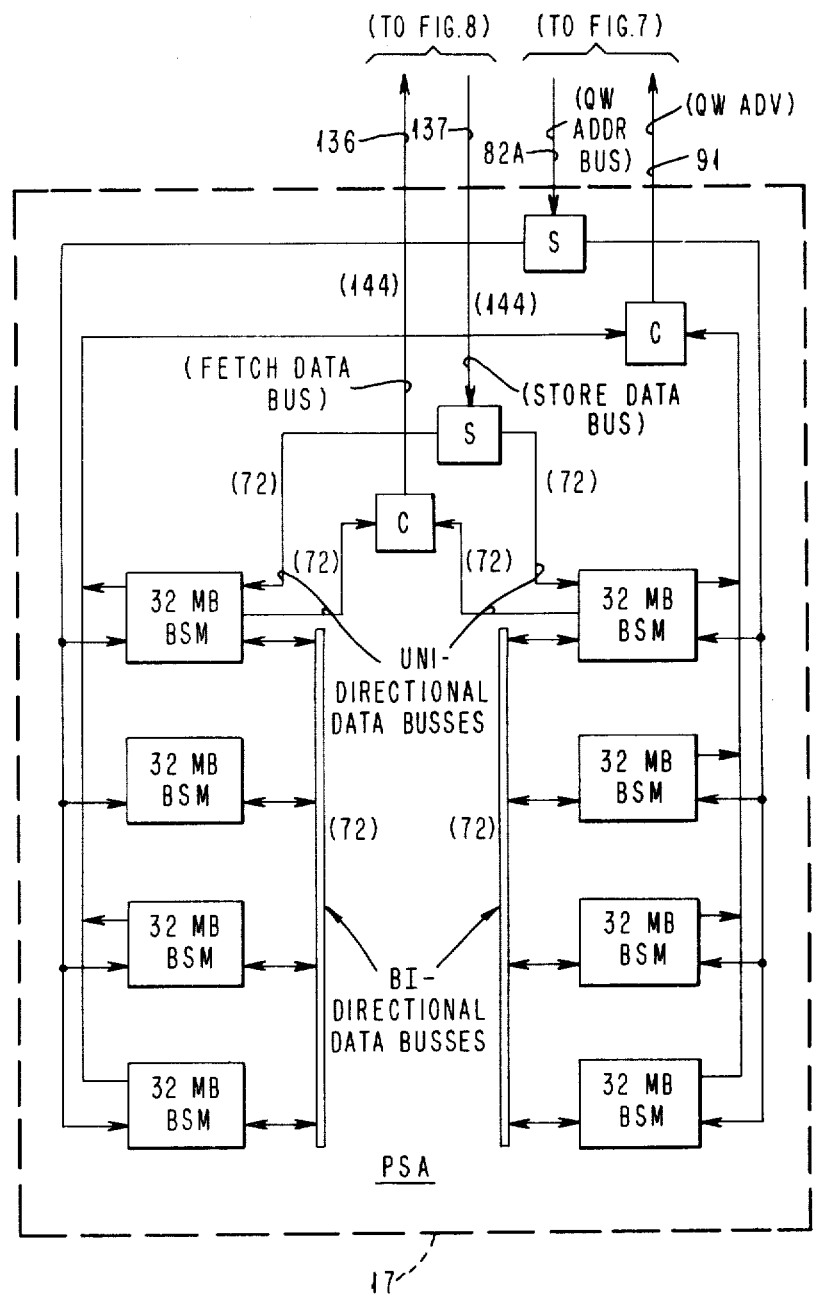
FIG. 9 illustrates an embodiment of page storage arrays (PSAs).

Bit positions 0–36 of register 82 are then outputted to the PS arrays (PSA's) in FIG. 9 to address the first line of the requested page, which is accessed and transmitted a quadword (QW) at a time on either the PSA fetch data bus 136 or PSA store data bus 137.

On the cycle before each QW of data is to be fetched from the PSA, or on the same cycle a QW is to be stored into PSA, a QW advance signal is activated on a line 91 from the PSA to increment counter 87 to generate the address of the next QW in the page.

Figure 8:
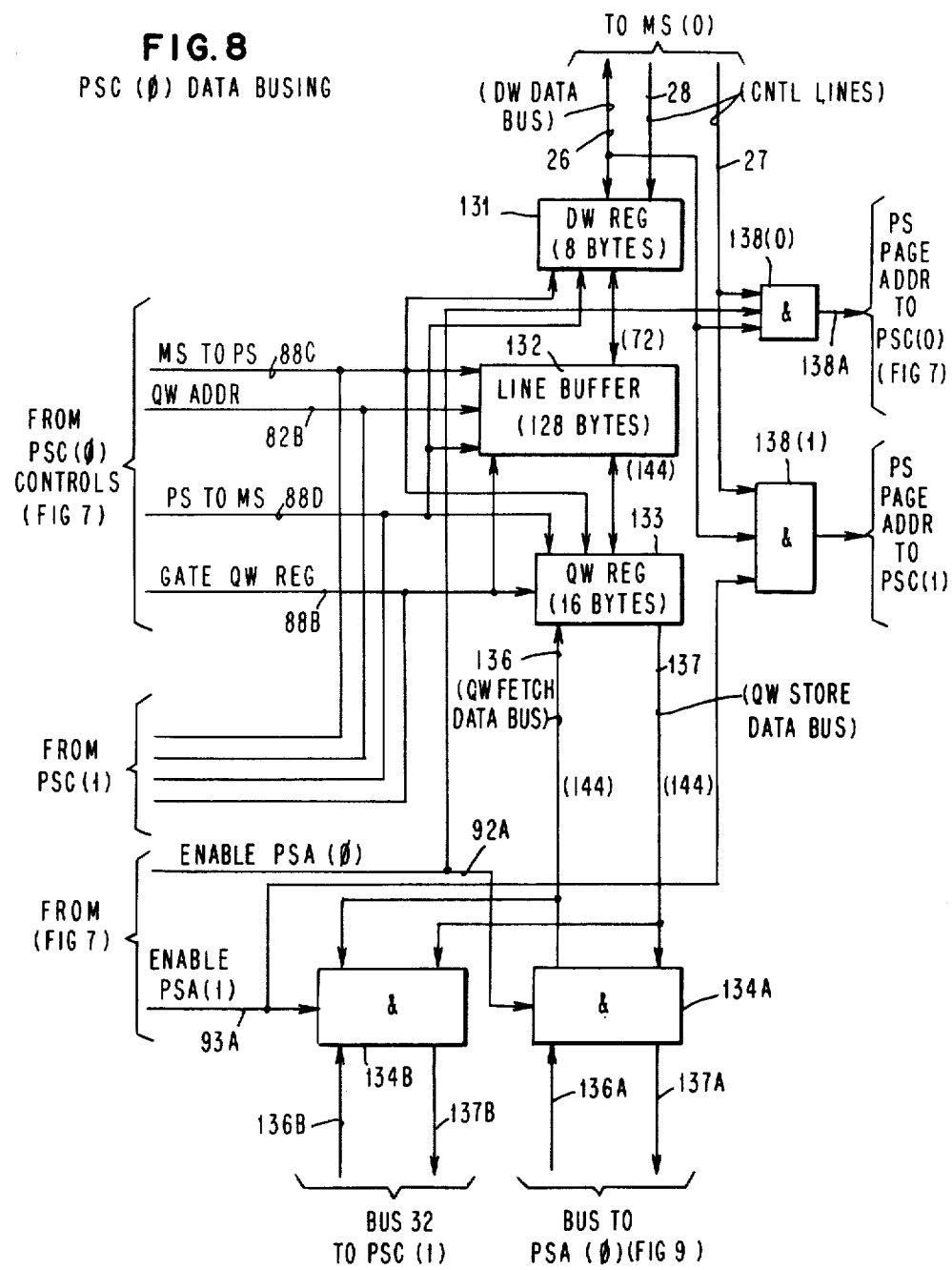
FIG. 8 represents the page storage data bus which connects to the main storage bus in the system controller which together obtain an independent bus for page transfers between page storage and main storage.

Each DW in the accessed line is passed between the MS controller and the data bus 26 in FIG. 1 or 8 with a control signal from line 80B being also passed through MS to PS control line 27, which is an advance signal to the PSC that MS is making its line access for a line transfer on the PS/MS data bus 26.

In FIG. 8, the advance signal on control line 27 conditions a doubleword (DW) register 131 to send or receive the next DW in the line during the next cycle, according to the direction signals received from the PSC in FIG. 7, i.e. on MS to PS line 88B or PS to MS line 88C.

Also for each QW access in PSA, counter 87 provides a QW increment signal to direction control circuits 88, which then outputs a gate QW signal to FIG. 8 to control the QW movement into or out of a QW register 133 and a line buffer 132.

When the last QW of the line is accessed by the PSC, counter 87 outputs a line increment signal for requesting the next line command be generated by the CP or CH which is executing the page transfer instruction. To do this, the line increment signal from counter 87 enables an AND gate 83 to output a next line signal on a PS response tag line 83A to the SC, enables a PS command encoder 84 to output a next line code to the SC, and enables the requestor identifier register 86 to output the current requestor identifier to the SC.

In FIG. 6, when the SC receives the line increment signal on response tag line 83A, it causes an AND gate 67 to pass the current requestor identifier on line 86A to a select response decoder 69 which activates a response line to that requestor. For example, activation of CP(0) select response line 69A to the CP(0) command controls 61 enables gate 74 to pass the PS response code on lines 84A to lines 61E in the control bus to CP (0) and it signals it to provide a command to the SC to request the next line transfer in the page being transferred.

Figure 5:
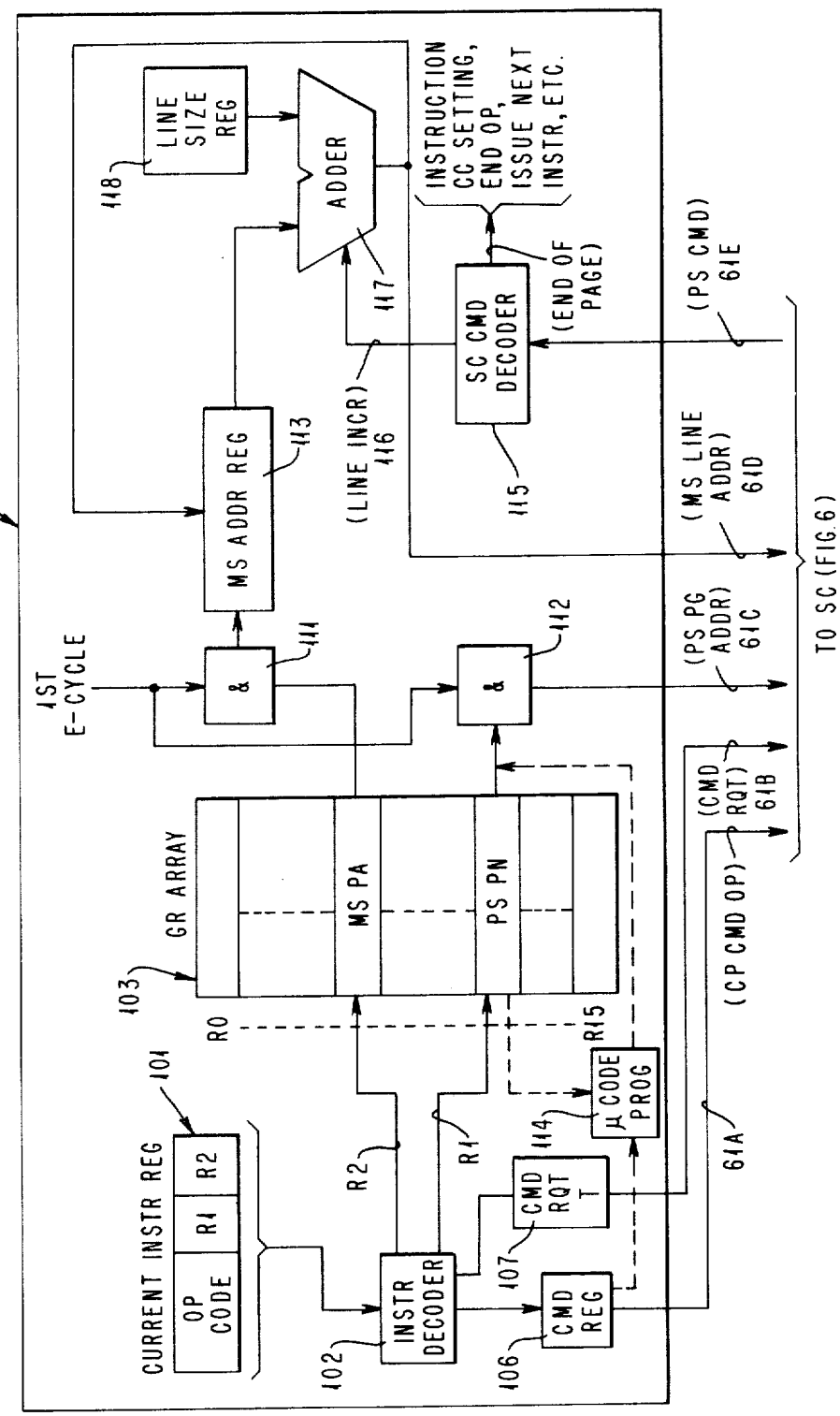
FIG. 5 represents novel circuit operations within a central processor for supporting an embodiment of the subject invention.

After the first line access, each subsequent line access of page data in MS occurs in response to the line increment signal in the PS commands received by the requestor, e.g. in FIG. 5 on lines 61E from the SC as an SC command. In FIG. 5, a requestor CP decodes the line increment code in an SC command decoder 115 to activate a line increment signal to an adder 117. The adder generates the next MS line address by adding the line size from a register 118 to the current MS address in an MS address register 113. The adder outputs the next line address on lines 61D to the SC for transmittal to MS. The adder output also is set into the content of the MS address register.

Figure 4:
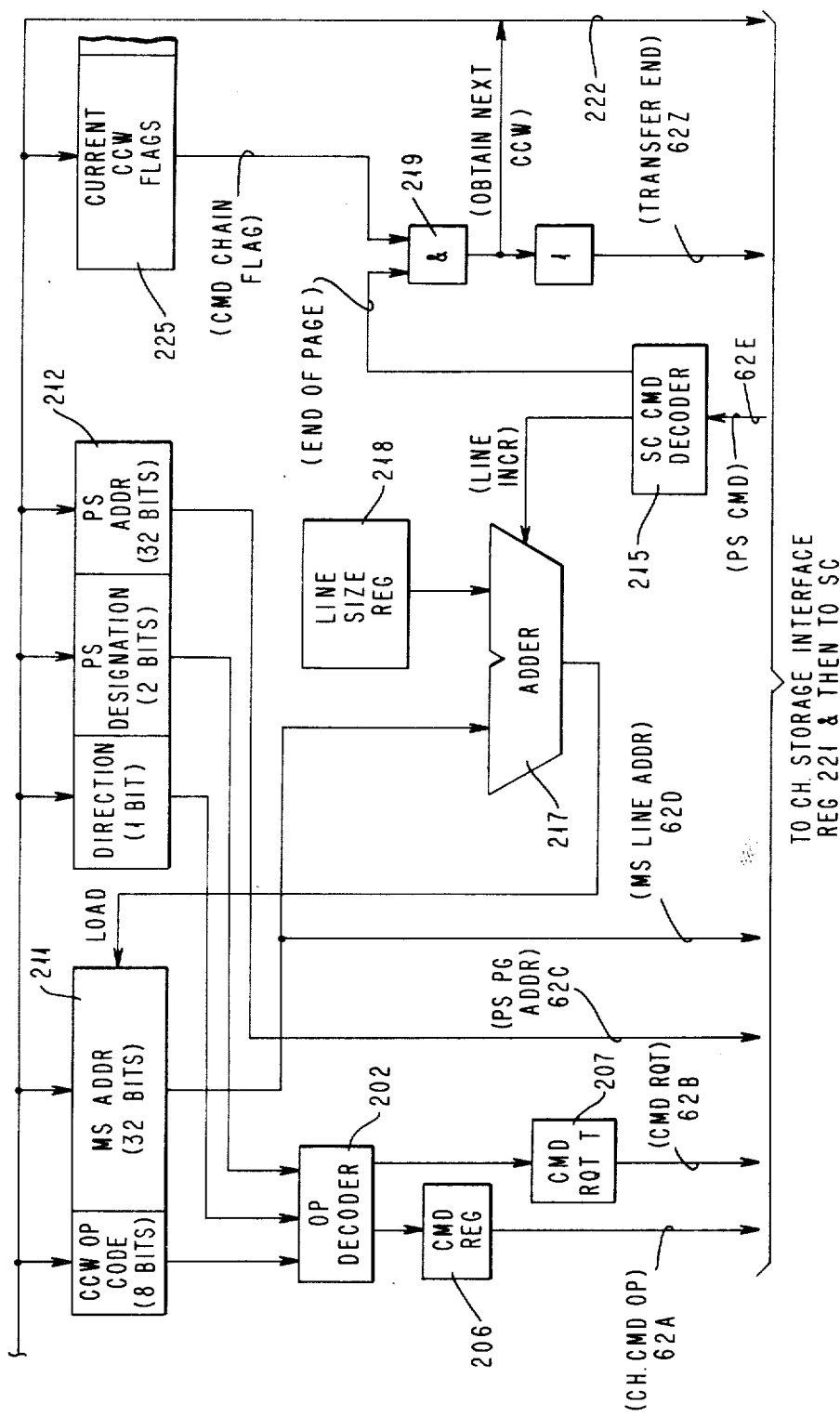
FIG. 4 represents the novel circuit operations within the channel processor for an embodiment of this invention.

A similar operation occurs in FIG. 4 when a requestor CH decodes a line increment signal in decoder 215 and generates the next MS line address in adder 217 using the MS address in register 211 and line size register 218.

In the SC (FIG. 6), the next MS line address on lines 61D or 62D passes through AND gate 73. After this command is accepted by the MS priority circuit 64, the MS line address is sent from gate 73 to the connnected MSC which accesses the line in the addressed MSA. The MS addressing of a line is a DW at a time on the MS data bus 26 and 16 DW transfers occur to transfer each line on the MS data bus 26. (The MS controls are not shown in detail because they may be constructed as taught in the prior art. For example, they may be comprised as described in U.S. patent application Ser. No.: 973,466; Filed: Dec. 26, 1978, entitled "Memory Configuration, Address Interleaving, Relocation and Access Control System" by K. G. Tan, and assigned to the same assignee as this application.) The PS and MS may both be constructed from the same technology. They also may be constructed of different technologies that preferably are interruptable on a MS access unit basis in order to obtain fast access to data in both.

The MS may have a single bidirectional MS data bus, or MS may have two unidirectional data buses respectively for fetching and storing a subpage unit transfer (e.g. doubleword), all of these MS data bus arrangements being in the prior art. The SC/MS bus 21 connects to the MS/PS bus 26, 27 by means of bus transfer gates in MSC for transferring the PS page address from MS to PS.

The continuation and rate of transfer of a page between MS and PS on the independent MS/PS bus is therefore determined by the responding entity, CP or CH, and contention for MS accesses from other requestors, e.g. other CPs or other CHs.

The inter-PS bus 32 in FIG. 2 allows any CP connected to either SC and MS to access any page in either PS(0) or PS(1). This also allows for increasing the size of the overall PS in the system, which comprises both PS(0) and PS(1).

In FIG. 7, the assignment of the PSC hardware to either PSC(0) or PSC(1) is done by an initial microprogram load (IMPL) setting an assignment trigger 91 to zero for PSC(0) or to one for PSC(1) assignment. PSA(0) is assigned page addresses from 0 to n, and PSA(1) is assigned page addresses from n to k, with the division in addresses being determined by a bit position in the PS address, e.g. bit position 0 in register 82.

This bit position is compared to the setting of assignment trigger 91 in a comparator 92. When trigger 91 is set to zero to assign the hardware to PSC(0), comparator 92 outputs a zero for a page address in PSA(0), and a one for a page address in PSA(1). These assignment signals are provided on lines 92A for PSC(0) and on lines 92B for PSC(1) when the page transfer control is by a CP or CH connected to SC(0), for example.

Page transfer instructions from a CP, or page transfer CCWs from a CH connected to SC(0) will have its PS address sent to the selected PSC(0) or PSC(1) by AND gate 138(0) or 138(1) in FIG. 8. Then the page transfer will proceed on the data busing in FIG. 8 under control of gating signals received from the selected PSC, which will be the local PSC, e.g. PSC(0), or the remote PSC, e.g. PSC(1).

If the remote PSC has the page address being accessed, the page data (QWs) will move across interPS bus 32 to the remote PSC which will access the page data under control of the local gating signals (e.g. lines 82A, 82B, 88A, 88B, and 88C with the use of gate 97 in FIG. 7).

As the local PSC receives page data transfers page data with a remote PSC on bus 32, the local PSC is transferring the page data to or from the local MS on the local MS/PS data bus (i.e. MS/PS data bus 0 or 1, whichever is the local bus).

Control of PS/MS Data Busing

The independent PS data bus operation thus far described may be done either synchronously or asynchronously with the instruction stream of the CP requesting the page transfer.

A synchronous transfer is controlled by a CP executing a pageout or pagein instruction, and that CP does no other activity until the page transfer is completed, which is when the execution of the instruction is complete.

An asynchronous (i.e. not synchronous) transfer is initiated by any CP issuing a start I/O (SIO) instruction to initiate a channel program to control the transfer between MS and PS of a set of pages. As soon as the initiating CP executes the SIO instruction, it can continue by executing other instructions (e.g. of another dispatched program) at the same time that CH is executing the channel program to control the PS/MS page transfer operation.

Synchronous Control Embodiment

Figure 13:
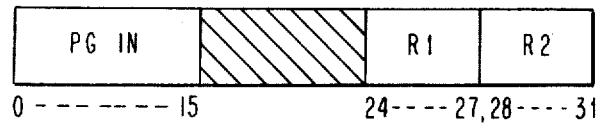
FIGS. 13 and 14 illustrate CP instructions for causing a page-in or page-out transfer of a page between main store and paging store on the independent data bus.
Figure 14:
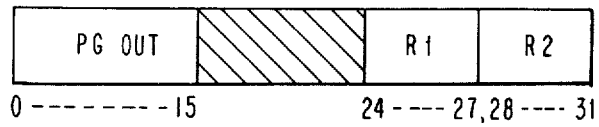

An embodiment of the synchronous CP control is represented in FIGS. 5, 13 and 14. FIG. 5 illustrates any CP in FIG. 1 or 2. The CP may include the conventional organization of an instruction decoding unit, general registers (GRs), instruction execution unit, cache (optional), storage controls, etc. Only the portions of the CP organization essential to the described embodiment are shown in FIG. 5.

The CP can execute either a page-in (PGIN) or page-out (PGOUT) instruction of the type shown in FIG. 13 or 14, which is received by the CP from its instruction stream into a current instruction register 101 shown in FIG. 5. The operation code in bits 0-15 of the instruction register 101 define the type of instruction which is being decoded in the instruction decoder 102. The R1 and R2 operands in the instruction are used by decoder 102 to address any two of the sixteen GRs in the GR array 103 in the CP. The R1 register contains the address in PS of the page frame to be accessed for the page transfer. The R2 register contains the address in MS of the page frame to be accessed for the page transfer. The R1 and R2 contents were previously loaded by a prior instruction with the MS and PS addresses.

When an instruction is decoded by decoder 102, it sets the operation code of the instruction into a command register 106 and sets a command request trigger 107, which send their signals to the SC in FIG. 6 on lines 61A and 61B, respectively. On the first execution (E) cycle of the instruction, the PS address content of R1 is outputted by a gate 112 on lines 61C and the corresponding MS address in R2 is outputted into MS address register 113.

The R1 content representation of the PS location of the page need not be the physical page frame address in PS. Instead, a PS page number (PN) may be assigned to a required page in PS independently of any page frame address in PS, which may later be assigned to the page to permit physical reorganization of the storage chips and modules comprising the PS. To do this, a microcode program (i.e. microprogram) 114 is initiated by the operation code of a page-in or page-out instruction in command register 106 which causes the PS PN in R1 to be used as a search argument in a table in an area of main storage in which PS addresses are assigned to the PS page numbers. The PS address corresponding to the PS PN search argument is returned to the CP, and the CP command provides the PS address on lines 61C to the SC, which sends it to PS to control the page access in PS.

The page access begins when the CP command is issued. It addresses the first line of the page to be transferred. Each line of data is transferred on the PS/MS data bus via the data bus transfer gates 41 in FIG. 6 connecting to the PS data bus lines and the MS data bus lines. The PS data bus lines are shown in FIG. 8 and transfer data in the direction required by the instruction (i.e. page-out requires the page to move from MS to PS, while page-in requires the page to move from PS to MS), under control of DW advance signals for MS and QW advance signals for PS.

The issuing CP uses the PS line increment signals to generate the MS address for each next line to be accessed in MS for the page. The PS address of each line to be accessed in PS is generated internally in the PSC by means of counter 87. The CP sends the PS address to MS on line 61D. The way the CP generates the next MS line address is in response to a PS command received on lines 61E from the SC, which occurs when the PSC activates its PS response tag line 83A with the CP identifier of this CP to bring up the select response line 69A to this CP. This CP's select response line 69A gates a line increment code from command encoder 84 (in FIG. 7) through the SC to the CP on lines 61E. The PS command is decoded by the CP in decoder 115 in which a line increment code activates an increment line 116 to an adder 117 that adds the current MS address in register 113 to a line size value from a register 118 to generate the next MS line address, which is loaded into register 113 as the new MS line address and is transmitted on lines 61D to the SC and then to MS when it is given MS priority by circuit 68 in the SC.

The MS line addresses continue to be generated by the CP in response to line increment signals from the PS line counter 87, which synchronizes the DW/QW transfer relationship between the PS and MS. Direction control circuits 88 in the PSC (FIG. 7) receive a command direction signal from the SC (obtained from the command operation code) to control the order of the gating signals to the data bus in FIG. 8. Circuits 88 control the outgating and ingating of the line buffer 132 so that the buffer outgating lags the ingating by at least one QW to maintain the data movement between PS and MS.

A page complete signal is outputted by counter 87 in the PSC (FIG. 7) when counter 87 overflows the page count. The page complete signal is provided on line 87B to command encoder 84 which then generates a page complete code which is sent on the PS response command bus 84A through the SC (FIG. 6) onto lines 61E as a PS command which is decoded in decoder 115 in the CP (FIG. 5), which thereby activates the end operation signals for the instruction, sets its condition code (CC), and causes the CP to issue its next instruction.

Asynchronous Control Embodiment

Figure 3:
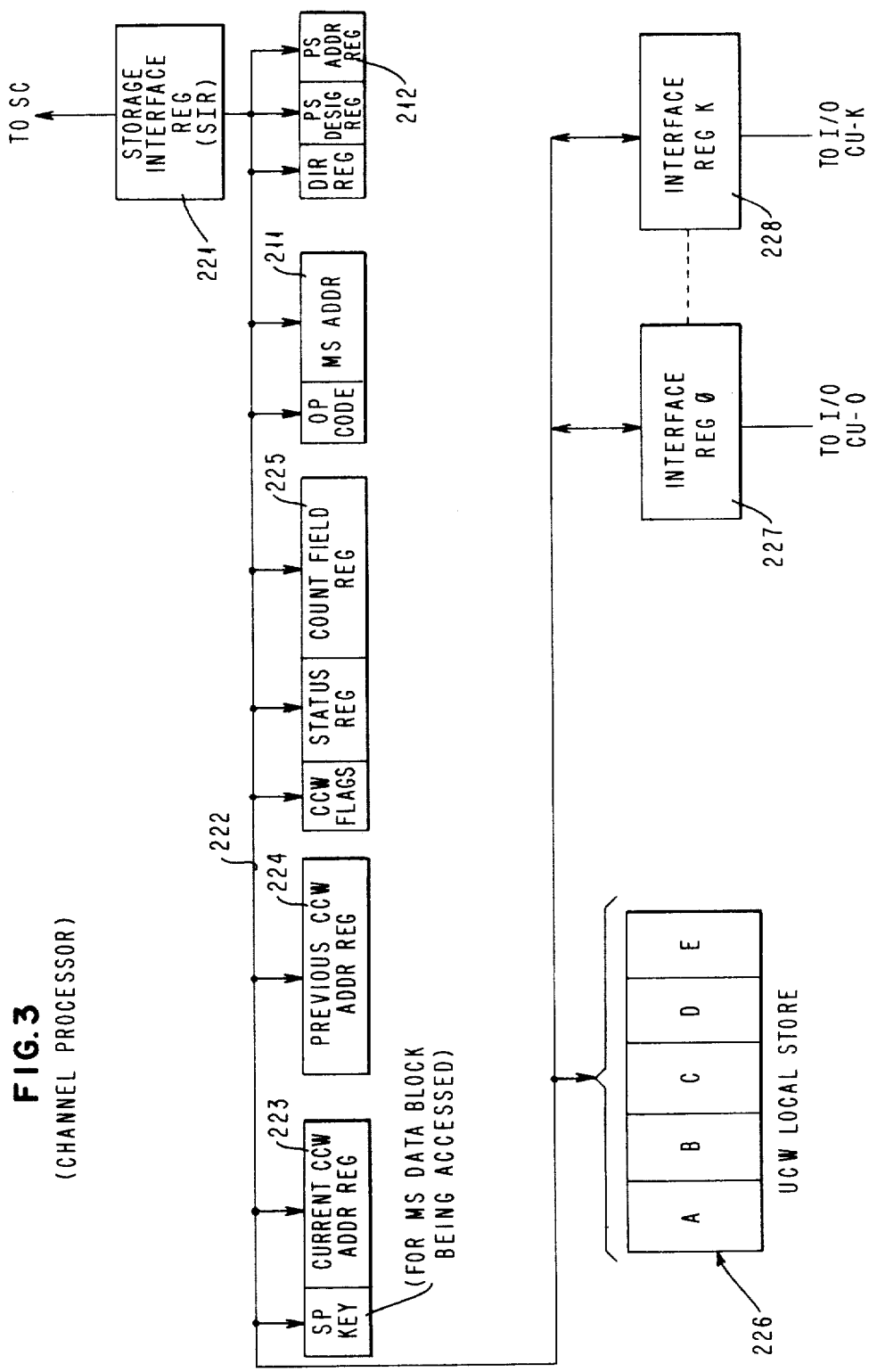
FIG. 3 represents bus connections and registers within a channel processor modified to support an embodiment of the subject invention.

The channel processor (CH) shown in FIGS. 3 and 4 can control a PS/MS page transfer instead of the CP, allowing the CP to be released to do other work during a CH controlled page transfer. The channel processor data flow shown in FIG. 3 is essentially the same as conventional channel processors (e.g. IBM 2880 channel) and all of conventional channel hardware is assumed to be included in FIG. 3 and is represented by items 221 through 228 therein.

Figure 15:
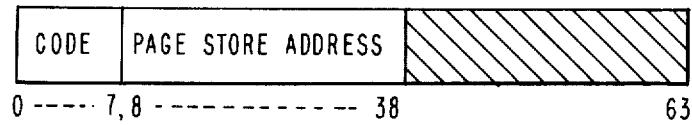
FIGS. 15, 16 and 17 illustrate channel control words for a channel processor to asynchronously control the page-in or page-out transfer between main storage and a paging storage on the independent data bus.
Figure 16:
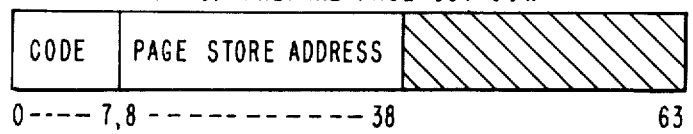
Figure 17:
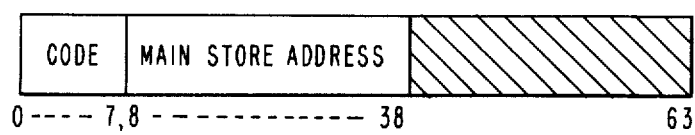

The novel hardware in FIG. 3 is represented by items 211 and 212, and FIG. 4 represents their interconnections to perform the channel operations required by this embodiment. The novel channel control words (CCWs) shown in FIGS. 15, 16 and 17 control the hardware shown in FIG. 4. These CCWs include a prepare page-in (PPI) CCW in FIG. 15, a prepare page-out (PPO) CCW in FIG. 16, and a copy page (CPG) CCW in FIG. 17.

Two CCWs are required in a channel program to control each page transfer. The first CCW is either PPO or PPI (depending on the required transfer direction) and contains the PS address. The second CCW is the CPG which contains the MS address of the page. In theory, it is possible to use a single CCW (instead of two CCWs) if the operation code, PS address, and MS address are contained in the single CCW.

The channel program for a MS/PS page transfer is initiated in the conventional manner by a CP executing a SIO instruction, which need not define any I/O device (or optionally it may define an I/O address for a third-media if any is required in the page transfer). The executing SIO accesses a channel address word (CAW) which addresses the first CCW of the channel programs in MS for controlling the page transfer. This invention also defines a novel field in CAW as a PS authority (PSAU) field, which must be set to a one state to authorize the use of the PS. In effect, the PSAU field acts as a PS address to select the PS for a transfer operation. If the PSAU field is set to zero, the channel program cannot contain any PPI, PPO or CPG CCW, and if any of these CCWs is encountered the channel program will be terminated immediately and a CP interruption is provided with a code set to a value that indicates to the system user that the channel program aborted due to violation of PS authorization. When CAW is accessed, the PSAU bit is set into a one bit paging authority field in register 212, which is used to condition the CH operations for PS.

When PSAU is set to one indicating PS authorization, and the channel program encounters a PPI or PPO CCW, its operation code is set into the CCW OP code field in register 211 in FIG. 4, while the PS address in the CCW is set into the PS address field in register 212. The page transfer direction between MS and PS is determined from an operation code bit of an executing PPO or PPI CCW, and it is set into a direction field in register 212. The MS address field in the CPG CCW is then set into the MS address field in register 211 and initiates the page transfer.

An operation decoder 202 receives the CCW operation code field from register 211 and the direction and PS address fields from register 212. A command register 206 and command request trigger 207 operate similarly to registers 106 and 107, respectively, in FIG. 5. Also the SC command decoder 215, adder 217 and line size register 218 operate similarly to the SC command decoder 115, adder 117, and line size register 118 in FIG. 5. Both line size registers 118 and 218 are loaded by microcode when the system is initialized, i.e. initial microcode program load (IMPL) operation. Thus, while a CPG CCW is executing, the MS address of each line in the page being transferred is generated in adder 217 in response to a line increment code received from PS. The resulting MS line address is put into the MS address field in register 211, from which it is sent on lines 62D to MS through the SC. When the end of the current page is reached, it is signalled by a page complete code (in the same manner as previously explained regarding the PS command encoder 84 in FIG. 7).

In FIG. 4, the PS page complete code is received and decoded in the SC command decoder 215 to activate an end of page signal to an AND gate 219, which is conditioned by the command chaining flag in the current CCW provided from register 225. If the command chaining flag is on, gate 219 outputs a signal on CH bus 222 to obtain the next CCW, which may be a PPI or PPO CCW followed by a CPG CCW for transferring the next page between PS and MS. In this manner, a single channel program can transfer any number of pages between PS and MS in any direction, and in any locations in PS and MS.

Whenever any CCW is encountered having its command chaining flag off, gate 219 will not be activated and instead provide a transfer-end signal via an inverter to line 62Z, which signals the end of the channel program and the end of the transfer of a set of pages between PS and MS.

The Way In Which The Invention Is Capable Of Being Exploited In Industry

Figure 10:
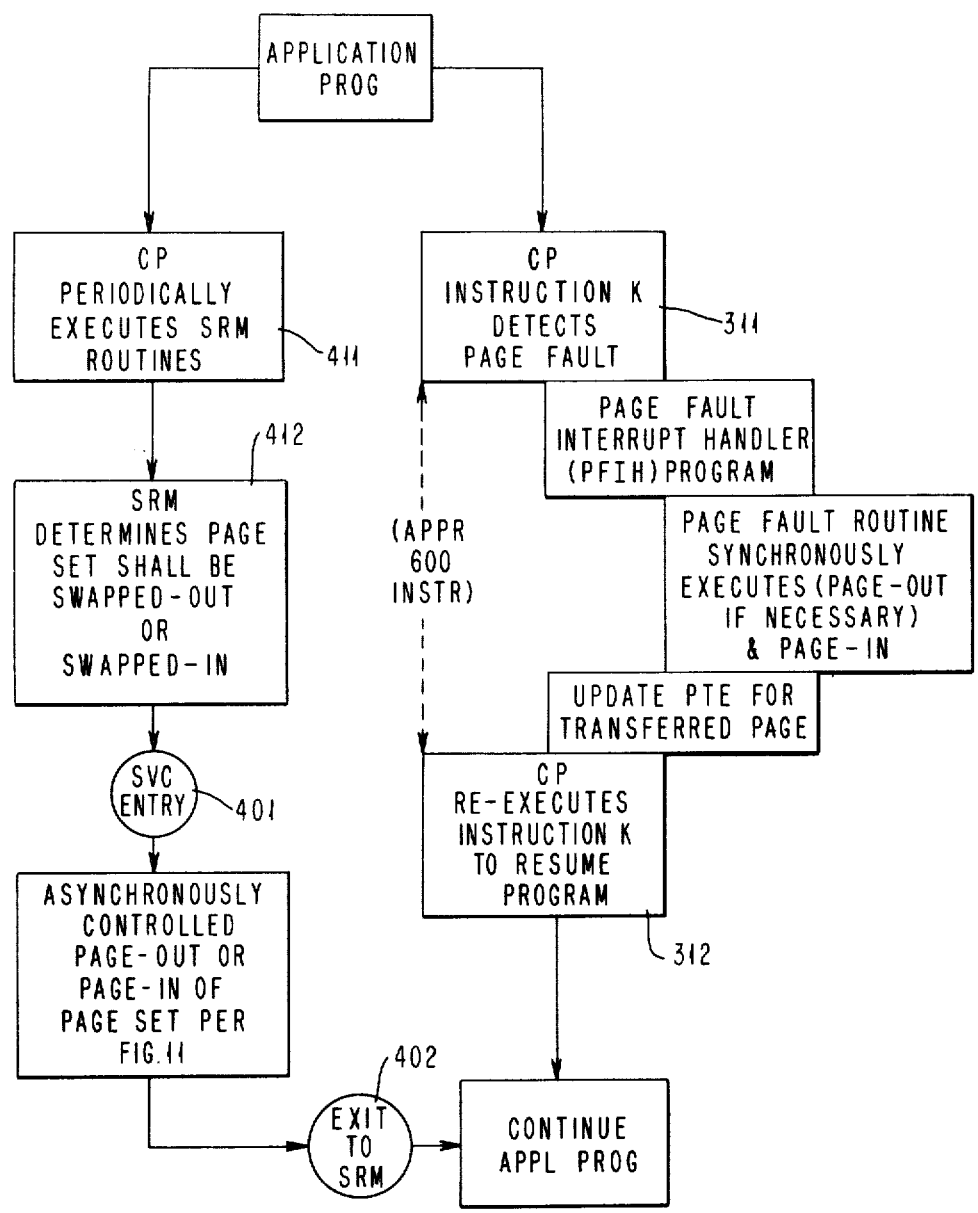
FIG. 10 represents a method embodiment in which the choice between synchronous or asynchronous paging control is made by which of two paths generally needing different amounts of page transfer service is being used in a system control program.

This invention includes the novel method shown in FIG. 10 for controlling the transfer of pages between PS and MS.

Figure 11:
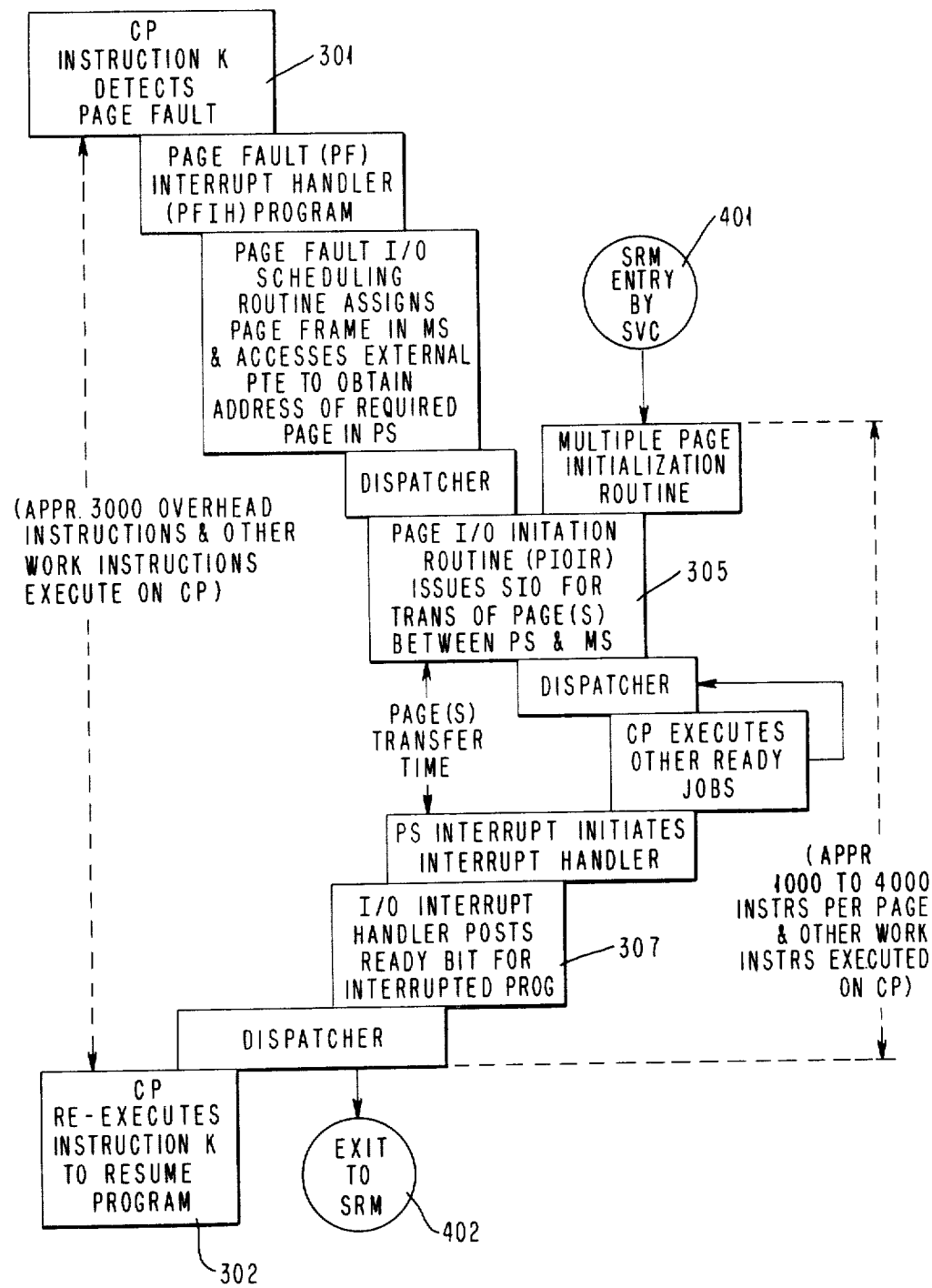
FIG. 11 illustrates prior art asynchronous paging control found in the IBM System/370 MVS programming.

In order to understand the reasons for this method, it is necessary to understand the system performance involved in executing certain prior art types of system control programs which obtain page transfers, e.g. in the prior IBM OS/370 MVS shown in FIG. 11. The prior MVS uses DASD as the system page storage (PS) and asynchronous channel programming to control the transfer of all page data on the channel data bus located between MS and PS. Channel controlled page transfers may be initiated by either of two different ways in MVS, involving two different situations, which are: (1) a page fault in MS determined during virtual address translation for any storage type instruction (called instruction K in FIG. 11), which occurs when the translation's page table entry is found invalid (i.e. its invalid bit is set on), or (2) the MVS SRM (system resource manager) program determines (during one of its periodic timing interruptions of CP operation) that a set of pages in MS will be swapped-out to PS, or will be swapped-in from PS to MS.

In prior art FIG. 11, situation (1) begins with box 301 and ends with box 302 when a page fault is detected during the translation of a CP requested address (in which the translation process does not find the page in MS having the requested address, but the page exists in PS).

Situation (2) uses entry point 401 in prior art FIG. 11, which occurs when SRM uses a supervisor call (SVC) instruction to enter the page I/O initiation routine (PIOIR) in MVS represented by box 305. The PIOIR routine finds the MS addresses of the pages in the swap set by searching the tables set up by SRM and using associated MVS routines (e.g. real storage manager program and auxiliary storage manager program) to manage the SRM requested paging transfers. The PIOIR routine issues the SIO instruction which initiates the channel program that performs the page transfer between PS and MS for the page set.

It is to be noted in FIG. 11 that for situation (1) the MVS page fault programming involves a large amount of CP overhead comprising approximately 3000 CP instructions executed before and after the channel program execution during which the page transfer occurs. (The 3000 instruction overhead does not include CP instructions executed while the channel program is executing, during which the CP is dispatched to execute some other ready program which was awaiting execution and which executes while the channel program is executing.)

When the page-transferring channel program ends, it sends a channel-end interrupt to the CP which uses the MVS I/O interrupt handler program 307 to post a ready bit in a control block for the interrupted program (i.e. the program with instruction K, or the SRM program, whichever caused the page transfer).

It is also to be noted in FIG. 11 that the CP overhead for situation (2) for the SRM page transfer is substantially less per page transferred since multiple pages (e.g. 10) are transferred per entry. The situation (2) overhead is approximately 1000 instructions per page in the 10 page example, providing 10,000 instructions of overhead. However, if the page set has only one page, then the overhead per page goes up to 4000 instructions.

But the inventive FIG. 10 uses the prior art programs in a novel way on the novel hardware shown in FIGS. 1-9 in which the independent data path enables the choice between synchronous or asynchronous control over any page or page set transfer between PS and MS.

In FIG. 10, a synchronous CP page transfer is used instead of the asynchronous channel program to handle a situation (1) page fault event, and the program path in FIG. 10 is taken from box 301 to 302. A total of approximately 600 CP instructions (a statistical average) of overhead is executed per page transfer using the synchronous page transfer path, during which the channel processor is not used and can be doing other work. These synchronous 3000 instructions of CP execution overhead in FIG. 11 are required to handle each page fault. Therefore, the invention in FIG. 10 may execute five times (3000/600) faster than the prior art to accomplish the same function, i.e. transfer of the same page to eliminate a page fault. The synchronous page-in instruction is shown in FIG. 13. The page-in transfer is preceded by the execution of the page-out instruction shown in FIG. 14 only if the MS page frame allocated for the page to be paged-in is occupied by a valid page not known to have an exact copy in PS, e.g. due to changed data, or not previously stored in PS. Most page fault operations involve only a single page-in transfer, because a bank of available page frames is maintained by a page stealing routine in the SCP, e.g. by the IBM MVS/370 SRM program.

In FIG. 10 for situation (2) where the SRM routine 412 initiates the transfer of a page set between PS and MS, it selects the prior art asynchronous programming in FIG. 11 between entry 401 and exit 402. The reason is that an SRM page set often contains a large number of pages (e.g. more than ten) which would involve a large amount of synchronous instructions (e.g. 10×600=6000 instructions) in comparison to substantially less than 3000 CP instructions for the asynchronously controlled transfer of a page set, regardless of the number of pages in the page set.

Therefore in FIG. 10, the SCP programming takes advantage of the independent data bus to switch between synchronous and asynchronous page transfer control according to the efficiency factor for the different situations requiring page transfer between MS and PS.

Figure 12:
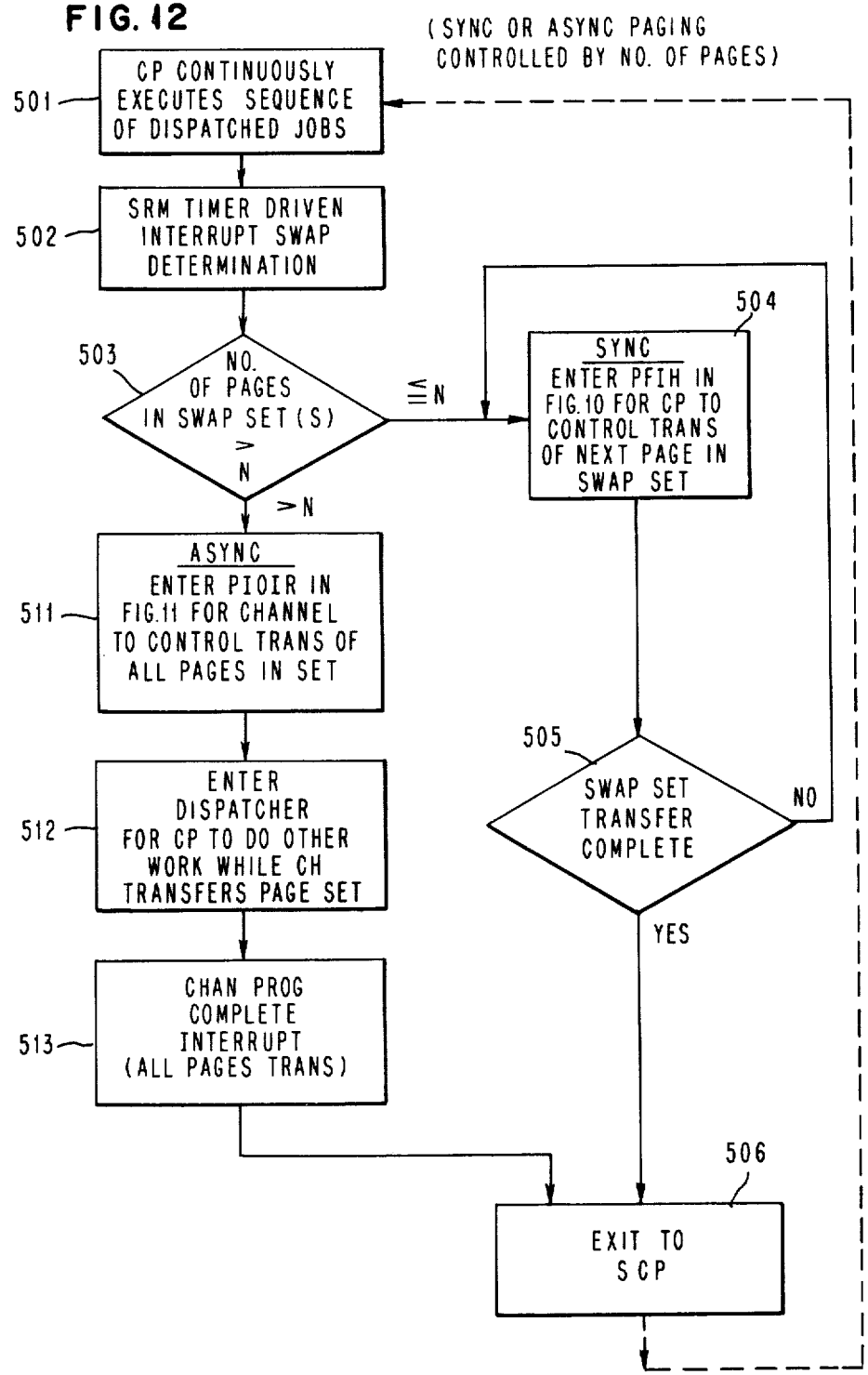
FIG. 12 illustrates another method embodiment in which the choice between synchronous or asynchronous paging control is made by the number of pages to be transferred in a group by the operating system.

In FIG. 12, the novelty is in using the number of pages in each page set to be transferred to determine whether the transfer will be controlled by the synchronous CP means or by the asynchronous channel processor means.

The method in FIG. 12 may be used instead of the method in FIG. 10, or it may be used only for SRM which can have page sets in which the number of pages in a page set may vary below or above a number N. The number N is chosen as the number of pages which can be moved by either the asynchronous channel method or the synchronous CP method with approximately equal CP overhead. It is expected that N is about 3 pages, wherein the CP can synchronously move 3 pages in about the time that CP can perform the overhead for a CH controlled asynchronous transfer of the three pages. If N is less than 3, a synchronous transfer is more efficient because it takes less overhead time than the asynchronous transfer. If N is over 3, the asynchronous CH transfer takes less CP overhead time and is preferred.

Thus, in FIG. 12, box 501 represents a CP's execution of a sequence of dispatched jobs. Box 502 represents the SRM timer-driven interruption in the CP job stream represented by box 501, at which point SRM has determined that a page set S should be swapped out or in of MS to or from PS, and SRM executes an SVC instruction (like that represented by entry 401 in FIG. 11) which causes the CP to enter an SCP routine represented by the remaining boxes in FIG. 12. Box 503 represents the instructions in this routine which compare the number S of pages in the set. If the set has the same or less than N pages, box 504 is entered to initiate the CP synchronous control of the transfer. If the set has more than N pages, box 511 is entered to initiate the channel processor asynchronous control over the data transfer on the main storage bus.

Box 504 in FIG. 12 represents instructions in the routine which execute the synchronous operation in FIG. 10 between SRM entry 401A and exit 402A back to SRM for the transfer of each page in the set. Then box 505 is entered to test if every page in the set has been transferred. If any page remains to be transferred, the NO exit is taken from box 505 back to box 504, and another page in the set is transferred. When box 505 determines all pages in the set have been transferred, box 506 is taken back to the SCP (system control program) which then returns to box 501 in which the normal job stream is executed in the CP.

If the page set has more than N pages, box 511 is entered from box 503 and initiates CH control over the asynchronous transfer of all pages in the set by taking entry 401 in FIG. 11. When the SIO instruction is executed in box 305, the channel control begins and the CP is released to do other work. This enables box 512 in FIG. 12 to be entered wherein the dispatcher program finds other jobs for the CP to execute simultaneously while the channel processor is asynchronously transferring the pages in the set. When the required page set transfer is completed by the channel program, a channel end interrupt (represented by box 513) is provided with a special interrupt code by a channel processor back to the CP. This CP interrupt causes the exit to the SCP represented by box 506, which then goes back to step 501 in which the CP is switched back to normal work processing.

The PS described in this specification may be used for either of two cases: (A) an appended extension of MS, or (B) as a hierarchical storage between MS and DASDs (direct access storage devices).

In Case (A), data movement is in a hierarchy from DASD to MS to CP (and in the reverse direction) with PS not being in the hierarchy and only receiving MS overflow to provide a temporary parking place for MS data not ready to be put on DASD. Thus, in case (A), PS need not contain a back-up copy of each page in MS.

In Case (B), all data movement is in a hierarchy from DASD to PS to MS to CP (and in the reverse direction) wherein PS is in the hierarchy and PS is the backing store for MS. Then PS must contain a backing copy of each page in MS, in addition to pages which have not yet been called into MS or have been completed by MS.

Therefore, in case (B), it is essential to have efficient DASD/PS transfers, since they must be done for all pages before they can be used in MS. However, in case (A), a need exists for an efficient PS/DASD transfer in order to output a completed page residing in PS.

The subject invention also includes novel channel programming control that substantially increases the efficiency of PS/DASD transfers in comparison to the way such transfers would need to be obtained using the conventional type of channel programming. The novel channel programming enables a single channel program to control a three-media transfer, i.e. between DASD and PS through MS in either direction.

The hardware embodiments described in relation to FIGS. 1 through 9 herein enable this novel type of three-media channel programming. A three-media transfer is done in the prior art by using two separate two-media channel programs to accomplish the same function of transferring a page set between PS and DASD through MS, i.e. a two-media channel program that controls the transfer between PS and MS, and another two-media channel program that controls the transfer between MS and DASD.

The novel three-media program within this invention also avoids the need for any special purpose hardware that otherwise would be needed to connect DASD directly to PS to enable a transfer between them to be controlled by a conventional type of two-media channel program.

In the prior art of the IBM System/370 architecture, the two-media channel program is initiated by a start I/O (SIO) instruction which specifies the DASD as one of the media in the transfer, and the second media is always implied to be MS in the two-media transfer. The execution of the SIO instruction involves the accessing in MS of a special word called the channel address word (CAW) which specifies the location of the channel program in MS. The channel program is comprised of channel control words (CCWs), and any CCW may specify an I/O operation and/or a MS address for a I/O data transfer.

The conventional two-media program ends when a command chaining flag in the last CCW of the program indicates no more CCWs are to be executed, and the channel processor thereby generates a channel end signal which is used to interrupt the CP which issued the SIO instruction that started the channel program. Therefore, in a current commercial System/370 environment, each two-media channel program requires preparatory CP executed routines similar to those explained in FIG. 11 which may involve the execution of 3000 CP instructions to prepare for the issuance of the SIO instruction which initiates the channel program.

In the prior art, if two separate two media channel programs are used to obtain a transfer between PS and DASD through MS, then two separate SIO instructions are required, each having a CP overhead of 3000 instructions for a total CP overhead of 6000 instructions to obtain the PS/DASD transfer.

On the other hand, the three-media transfer of this invention obtains the PS/DASD transfer via MS using only a single SIO instruction, and therefore requires only one set of the preparatory 3000 CP instructions (in comparison to 6000 instructions for the conventional two channel program PS/DASD transfer). This invention hence results in a 50% saving in CP overhead per page set transfer between PS and DASD.

Furthermore, a PS/DASD transfer through MS may use the same page frame in MS for the transfer of all pages in a page set. As a result, the storage allocation in MS is minimal for a PS/DASD transfer; and the plural pages in the page set will not be in MS when the PS/DASD transfer is complete.

Figure 18:
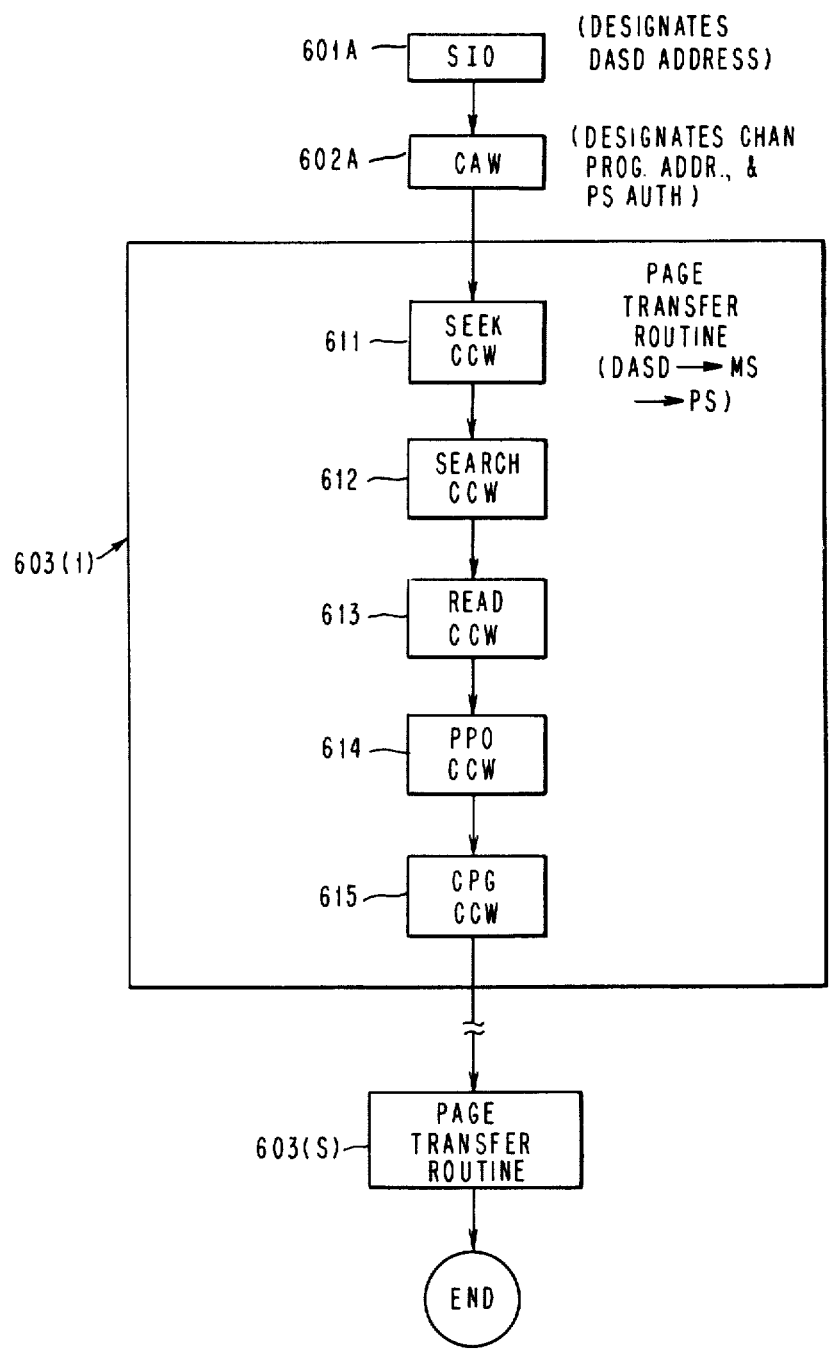
FIG. 18 illustrates a block diagram embodiment of a three-media channel control program for controlling the transfer of data from the channel to main storage to page storage.

FIG. 18 represents a three-media channel program for controlling a page set transfer in the direction from DASD to MS to PS. FIG. 19 represents a three-media channel program for controlling a page set transfer in the other direction from PS to MS to DASD. Each of these channel programs is initiated by box 601A or 601B in which the CP executes a SIO instruction which defines the DASD for the channel program and accesses a CAW (box 602A or 602B) in which a PS authority field (e.g. a bit position) is set to a one state to authorize the use of PS by the channel program and an address field locates the required channel program in MS.

The channel routine 603(1) in FIG. 18 transfers the first page of the set. It locates the page on DASD and reads it into MS using the conventional seek, search and read CCWs (boxes 611, 612 and 613). Then the novel PPO CCW (FIG. 15) is executed in box 614 in FIG. 18 to prepare PS for the transfer, and finally the CPG CCW (FIG. 17) is executed in box 615 of FIG. 18 to address the page in MS (received from DASD) and cause it to transfer to the PS address of the PPO CCW. The first page transfer is thereby completed under control of channel routine 603(1).

Each other page in the set is transferred by another routine 603 which is identical to routine 603(1), except for the PS location for each page and (optionally) the MS address of the page (which may be made the same for all pages in the set if it is preferred to use the same page frame in MS to buffer all pages during the transfer).

A similar routine in box 603(S) in FIG. 18 is used to transfer the last page in the set which is like the other boxes 603, except for having at least a different PS page address and having its last CCW contain a command chaining flag with a zero state to indicate the end of the channel program.

In FIG. 19, the channel page transfer routines operate in the reverse direction, i.e. PS to DASD. Thus, the first page in the set is transferred by the page transfer routine 604(1) by executing a PPI CCW (FIG. 16) and then a CPG CCW (FIG. 17) to move the first page from PS to MS. Then in FIG. 19, the seek, search and write CCWs (boxes 623, 624 and 625) execute to move the first page from MS to DASD.

Routine 604 repeats (except for the PS and perhaps MS addresses) for each other page transferred from PS to DASD, except that the last routine 604(S) for transferring the last page in the set has the command chaining flag set off in its last CCW to end the channel program.

It may be most efficient to have the MS address in each routine in FIG. 18 be different to cause each page in the set (or a subset of the pages in the set) to be retained in different page frames in MS (as well as have all pages in the set be retained in PS) during the DASD to PS transfer, so that the pages are immediately available for processing in MS as soon as the DASD to PS transfer of the set is completed.

The embodiments avoid a direct SC to PS address bus to eliminate that hardware and its cost without significant performance loss by using the existing busing between the SC and MS and MS forwarding the PS address on the MS/PS busing. It is apparent from this invention that a SC/PS address bus could be provided, but that this embodiment saves the additional SC pin connections which would be needed to provide the additional SC/PS address bus. Such additional busing would not obtain any significant system performance improvement, since the SC to PS communication of the page address need only be done once per page transfer to initiate the access of the first PS line in the page.

Although this invention has been shown and described with respect to plural embodiments thereof, it should be understood by those skilled in the art that various changes and omissions in the form and details of the invention may be made therein without departing from the spirit and the scope of the invention.

Having thus described our invention, what we claim as new and desire to secure by Letters Patent is:

1. In a data processing system having at least a central processor (CP), main storage (MS), a channel processor (CH), and a storage control means (SC) for connecting MS to the CP and to the CH, the system characterized by:
    first and second data storage devices for storing data records;
    first data bus means in the SC for connecting MS to the first data storage device to provide a first record transfer data bus between MS and the first data storage device;
    second data bus means in the SC for connecting MS to the second data storage device to provide a second record transfer bus between MS and the second data storage device;
    a CH program for transferring records between the first and second data storage devices through MS:
    a CP instruction for execution on a CP that designates the first data storage device and accesses a field in MS designating the second data storage device for a record transfer;
    the CH program including channel control words (CCWs) for controlling a record transfer between MS and the first data storage device on the first data bus means, and other CCWs for controlling a record transfer between MS and the second data storage device on on the second data bus means;
    whereby a three-media page transfer is obtained between the first device, MS and the second device in either direction by means of a signal CH program.

2. In a data processing system having at least a central processor (CP), main storage (MS), and a channel processor (CH), storage control means (SC) for controlling the priority to MS of access requests to MS, the system characterized by:
    a page storage (PS);
    independent data bus means controlled in the SC for transferring a page of data in subpage units between PS and MS;
    instruction means in the CP for decoding and executing an instruction specifying the transfer of a page between PS and MS on the data bus means;
    CP command request means for generating a page transfer command for the page transfer instruction executed by the CP, the command including a page location in PS and MS;
    control bus means connecting the CP command request means to PS and MS;
    PS subpage unit counter means connected by the control bus means to the CP for generating a subpage unit increment signal for each next subpage unit to be accessed in PS for a page being transferred, the counter means enabling a page completion signal when a predetermined count value is reached;
    CP subpage unit address means for receiving the increment signal from the control bus means and generating a corresponding MS subpage unit address which is sent to MS on the control bus means;

means for communicating to the instruction means each page completion signal enabled by the counter means for enabling the instruction means to initiate decoding and execution of a next instruction for the CP in order to synchronize each page transfer on the independent page transfer bus with the instruction stream executed by the CP.

3. In a data processing system having at least a central processor (CP), main storage (MS), a channel processor (CH), a storage controller (SC) for controlling the priority of access requests to MS by CP and CH, a channel address word (CAW) being accessed in MS by a CP initiation of each channel program, CH registering means for receiving a content from a channel address word (CAW) locating a channel program in MS and for receiving a content from each channel control word (CCW) fetched from MS by the channel including the operation code, MS address field and flag field of each fetched CCW, the system characterized by:

a page storage (PS);

independent data bus means controlled in the SC for transferring a page of data between PS and MS in subpage units;

a PS designation field being provided in the CH registering means for being set from the CAW for designating the PS as a medium controllable by CH;

PS controlling CCWs in the channel program setting a PS page location field, the operation code and the MS address field in the CH registering means when the PS designation field is set with a PS designation;

control bus means connecting the CH to MS and PS;

PS subpage unit counter means connected by the control bus means to the CH for generating a subpage unit increment signal for each next subpage unit to be accessed in PS for a page being transferred;

subpage unit address generating means in CH for receiving the subpage unit increment signals for generating the next MS subpage unit address from the content of the MS address field in the CH registering means and sending the MS subpage unit address to MS on the control bus means;

a set of pages being transferred in either direction on the independent data bus means under control of the channel program while an instruction stream is being simultaneously being executed by the CP.

4. In a data processing system having at least a central processor (CP), main storage (MS), a channel processor (CH), a storage controller (SC) for controlling the priority of access requests to MS by CP and CH, a channel address word (CAW) being accessed in MS by a CP initiation of each channel program, CH registering means for receiving a content from a channel address word (CAW) locating a channel program in MS and for receiving a content from each channel control word (CCW) fetched from MS by the channel including the operation code, MS address field and flag field of each fetched CCW, the system characterized by:

a page storage (PS);

independent data bus means controlled in the SC for transferring a page of data in subpage units between PS and MS;

a PS designation field being provided in the CH registering means for being set from the CAW for designating the PS as a medium controllable by CH;

PS controlling CCWs in the channel program setting a PS page location field, the operation code, and the MS address field in the CH registering means when the PS designation field is set with a PS designation;

control bus means connecting the CP, CH, MS and PS;

PS subpage unit counter means for generating a subpage unit increment signal for each next subpage unit to be accessed in PS for a page being transferred, the PS subpage unit counter means being connectable by the control bus means to the CP and CH;

CH subpage unit address generating means for receiving the subpage unit increment signal from the control bus means and generating a corresponding MS subpage unit address from the content of the MS address field in the CH registering means and sending the MS subpage unit address to MS on the control bus means under CH control;

CP page transfer instruction decoding and execution means in the CP for executing an instruction specifying the transfer of a page between PS and MS;

CP command request means for generating a page transfer command for the page transfer instruction executed by the CP, the command including a page location in PS and MS;

CP subpage unit address means for receiving the increment signal from the control bus means and generating a corresponding MS subpage unit address which is sent to MS on the control bus means under CP control;

a page transfer in either direction on the independent data bus means between PS and MS being done in parallel with an instruction stream being executed by the CP when the page transfer is CH controlled, but being serial with the CP instruction stream when the page transfer is CP controlled.

5. A method of controlling a transfer of pages in either direction between a page storage (PS) and a main storage (MS) of a data processing system having at least one central processor (CP) and a channel processor (CH), a channel program in MS for controlling the transfer of a page set having one or more pages, system control programming in the system executable by the CP and having a page fault control program and a page set swapping control program, the method characterized by:

moving data for each page being transferred on an independent data bus between MS and PS, the independent data bus not passing a page being transferred through either the CP or CH;

executing the channel program to control page transfers on the independent data bus in response to the page set swapping control program requesting a transfer of a page set;

executing a first type of CP instruction for controlling a MS to PS page transfer on the independent data bus in response to the page fault control program requiring a requested page when a page-frame space in MS must be freed to receive that requested page;

executing a second type of CP instruction for transferring the requested page on the independent data bus from PS into the page-frame space in MS in response to the page fault control program;

whereby page transfers between PS and MS on the independent bus are selectively controlled by CH under control of the page set swapping control program and by CP under control of the page fault control program.

6. A method of controlling a transfer of a page in either direction between a page storage (PS) and an I/O device through a main storage (MS) in a data processing system having at least one central processor (CP) and a channel processor (CH), a channel program in MS for controlling the transfer of a page set having one or more pages, a CP instruction initiating the execution of the channel program, the method characterized by:
  moving data for each page being transferred on a dedicated paging bus between MS and PS, the paging bus not connected to either the CP or CH,
  initiating a channel program by executing a CP paging instruction that designates an I/O device, accesses a channel address word (CAW) that designates a PS location for a page transfer between the I/O device and PS through MS, and specifies the transfer direction; the channel program containing PS control words which control the page transfer between PS and MS and other I/O control words which control the page transfer between the I/O device and MS,
  whereby a single channel program controls the transfer between the three-media of PS, MS and the I/O device.

7. In a data processing system having at least a central processor (CP), main storage (MS), a channel processor (CH), and a storage control means (SC) for providing control and data buses connecting MS to the CP and the CH, the system characterized by:
  random access page storage (PS), and a PS control means connected to PS;
  PS control bus means for connecting the CP to the PS control means;
  an independent page transfer bus connected between PS and MS for transferring data of each page in subpage data units, the page transfer bus not passing the page data through either the CP or CH in order to provide a fast and simple path for data transfers between PS and MS;
  instruction means in CP for initiating a page transfer on the page transfer bus by CP signalling in response to a page transfer instruction in a CP program;
  subpage control means activated by the CP signalling for generating each next subpage request signal for controlling a transfer of a next subpage data unit on the page transfer bus;
  MS control means and the PS control means receiving each next subpage request for respectively controlling the access of respective locations in MS and PS for subpage data of each subpage request currently provided by the subpage control means;
  the PS control means providing a subpage completion signal to the subpage control means to initiate the generation of each next subpage request;
  the subpage control means also generating a page completion signal upon receiving from the PS control means a last subpage request signal for a page transfer and providing each page completion signal to the CP instruction means;
  the CP instruction means executing a next instruction in the same CP program in response to receiving each page completion signal from the subpage control means without any program interruption being done by the CP upon completion of a page transfer instruction in the data processing system, and no interrupting program services being needed after a page transfer on the page transfer bus.

8. In a data processing system as defined in claim 7, the system characterized by:
  the subject control means comprising:
    PS addressing means for generating each next subpage address in PS for the next subpage data unit;
    MS addressing means for receiving each next subpage request and generating therefrom a MS request with an address in MS for the next subpage data unit; the MS control means comprising:
    MS access priority means for receiving all MS access requests including each MS request for a subpage access and awarding each next MS access cycle to a highest priority MS request.

9. In a data processing system as defined in claim 8, the system further characterized by:
  the subpage control means being in the CP;
  MS bus means for transferring the MS requests from the CP to MS including MS requests for subpage locations in MS;
  the MS bus means controlling data transfers on the page transfer bus by means of the MS access priority means.

10. In a data processing system as defined in claim 9, the system further characterized by:
  instruction means in the CP initiating a page transfer on the page transfer bus by executing either a page-in instruction or a page-out instruction for respectively controlling a required direction of page transfer;
  the instruction means waiting until the non-interrupt page completion signal when executing a page transfer instruction to synchronize the start of execution of the next instruction in an instruction stream on the CP without any intervening program interrupt.

11. In a data processing system as defined in claim 10, further characterized by:
  the subpage control means also being in the CH for controlling the transfer of subpage data units on the page transfer bus and providing addresses to PS and MS for accessing subpage locations respectively in PS and MS;
  CP or CH controlling page transfers on the page transfer bus respective subpage control means.

12. In a data processing system as defined in claim 11, the system further characterized by:
  a CP program to control the page transfer on the page transfer bus, the CP page control program comprising either a page-in instruction or a page-out instruction according to the required direction of page transfer;
  the subpage control means being in the CP to synchronize the data transfer between MS and PS in a required direction of subpage data units on the page transfer bus;
  a CH program selectable by the CP program to control a page transfer on the page transfer bus;
  the CH program at least comprising either a page-in or page-out channel control word according to the required direction of page transfer, the CH program executing on the CH independent of the CP operation.

13. In a data processing system as defined in claim 11, the system further characterized by:

a CH program selected by a CP program to control a page transfer on the page transfer data bus;

the CH program at least comprising either a page-in or page-out channel control word in accordance with the required direction of page transfer;

page transfers on the page transfer bus under control of the CH program being in parallel with the execution of instructions in an instruction stream on the CP.

14. In a data processing system as defined in claim 13, the system characterized by:

a CP program comprising:
   a page fault detection program means for initiating CP control over the transfer of a small set of pages on the page transfer bus during which the CP waits for each page transfer completion before initiating a next CP instruction without program interruption, and
   a page swap detection program means for initiating CH control over the transfer of a large set of pages on the page transfer bus during which the CP continues to execute CP instructions which are program interrupted by a CH interrupt signal when the transfers are completed for the set of pages on the page transfer bus.

15. In a data processing system as defined in claim 14, the CP program further characterized by:

a page set size control routine including:
   means for indicating the number of pages, S, in a page set to be transferred between PS and MS on the page transfer bus;
   comparing means for comparing the page number, S, with a selection number, N;
   means for initiating CP control over the page transfer of each page in a small set on the data bus if S is less than N;
   means for initiating CH control over the page transfer of a large set if S is greater than N.

16. In a data processing system as defined in claim 10, in which a page transfer instruction is characterized by:
   an operation code indicating a page-in or page-out transfer between MS and PS and addresses for two general registers containing the MS location and the PS location for the page to be transferred on the page transfer data bus.

17. In a data processing system as defined in claim 11, the CH using a channel program further characterized by:
   a PS controlling channel control word (CCW) which has a page-in or page-out operation code, and the two CCWs respectively containing a page location in the PS and a page location in MS.

18. In a data processing system as defined in claim 17, the system further characterized by:

a CP initiating program executing a CP paging instruction designating an I/O device, accessing a field in MS designating a PS location for a transfer, and locating a CH program in MS; the CH program for transferring a page between an I/O device and PS through MS; the CH program including PS controlling channel control words (CCWs) for controlling page transfers between MS and the PS location on the page transfer data bus in either direction, and also including I/O controlling CCWs for controlling the page tranfer between MS and the I/O device in a corresponding direction, the PS controlling CCWs and I/O controlling CCWs being intermixable in the CH program;

means for initiating the located CH program to obtain the page transfer between PS and the I/O device through MS in either direction.

19. In a data processing system as defined in claim 8, the system further characterized by:

a CP program having paging instructions to control the page transfers on the page transfer bus;

the subpage control means being in the CP to synchronize a page transfer between MS and PS in a required direction in subpage data units on the page transfer bus;

a CH program selected and initiated by the CP program designating a channel or subchannel to control page transfers between an I/O device and MS;

the CH program having channel control words (CCWs) for controlling a required page transfer, the CH program executing on the CH independent of the CP instruction execution.

20. In a data processing system as defined in claim 19, the system characterized by:

a CP program comprising:
   subchannel instruction means in the CP for initiating CH control over the transfer of a large set of pages between an I/O device and MS after which the CP continues to execute other CP instructions which are program interrupted by a CH interrupt signal when the transfer of the set of pages is completed;
   a page fault detection program means using a page instruction for initiating each transfer of a specified page under CP control of subpage data units on the page transfer bus and during each page transfer the CP waits for page transfer completion before executing a next CP instruction to obtain page transfer synchronism with an instruction stream in the CP.

21. In a data processing system as defined in claim 20, the paging instructions further comprising:
   a page-instruction and a page-out instruction, each respectively controlling a different direction of page transfer on the page transfer bus.

* * * * *